US012794888B2

(12) United States Patent
Wu et al.

(10) Patent No.: US 12,794,888 B2

(45) Date of Patent: Nov. 10, 2026

(54) SERVICE AUTHORIZATION METHOD AND SYSTEM, AND COMMUNICATION APPARATUS

(71) Applicant: HUAWEI TECHNOLOGIES CO., LTD., Shenzhen (CN)

(72) Inventors: Yizhuang Wu, Beijing (CN); He Li, Shanghai (CN); Rong Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 137 days.

(21) Appl. No.: 18/452,003

(22) Filed: Aug. 18, 2023

(65) Prior Publication Data

US 2023/0396602 A1 Dec. 7, 2023

Related U.S. Application Data

(63) Continuation of application No. PCT/CN2021/077134, filed on Feb. 21, 2021.

(51) Int. Cl.
*H04L 9/40* (2022.01)

(52) U.S. Cl.
CPC .......... *H04L 63/10* (2013.01); *H04L 63/0807* (2013.01)

(58) Field of Classification Search
None
See application file for complete search history.

(56) References Cited

U.S. PATENT DOCUMENTS

| | | | | |
|---|---|---|---|---|
| 2017/0034172 | A1 | 2/2017 | Biggs et al. | |
| 2020/0007335 | A1* | 1/2020 | Tan | H04L 9/32 |
| 2021/0288802 | A1* | 9/2021 | Muhanna | H04L 9/3263 |
| 2025/0175798 | A1* | 5/2025 | Rost | G06F 21/41 |

FOREIGN PATENT DOCUMENTS

| | | | |
|---|---|---|---|
| CN | 111865597 | A | 10/2020 |
| CN | 111865888 | A | 10/2020 |
| WO | 2020220919 | A1 | 11/2020 |

OTHER PUBLICATIONS

Mizrahi (RFC 7384, IETF, Oct. 2014) (Year: 2014).*

(Continued)

*Primary Examiner* — Boris D Grijalva Lobos
(74) *Attorney, Agent, or Firm* — Rimon PC

(57) ABSTRACT

Embodiments of this application disclose a service authorization method and system, and a related communication apparatus. In the method, a first network element obtains a first access token from a token generation network element, and sends a first service request for a specified service to a second network element. The first service request includes the first access token, which indicates that a network function (NF) service consumer network element has permission to access a specified service provided by an NF service producer network element belonging to a specified service domain. The first access token includes an identifier of the NF service consumer network element, an identifier of the specified service, and first service domain information associated with the specified service domain. The first service domain information is carried in the first access token, so that service domain-based access control can be implemented, thereby improving security of a service authorization.

20 Claims, 13 Drawing Sheets

(56) References Cited

OTHER PUBLICATIONS

3GPP TSG-SA3 Meeting #100e, e-meeting, Aug. 17-28, 2020, S3-202259, "Authorization of NF service access," Nokia, Nokia Shanghai Bell; 14 total pages.
ETSI TS 133 501 V16.5.0 (Jan. 2021), 5G;Security architecture and procedures for 5G System (3GPP TS 33.501 version 16.5.0 Release 16); 257 total pages.
3GPP TR 33.855 V16.1.0 (Sep. 2020), 3rd Generation Partnership Project; Technical Specification Group Services and System Aspects; Security Aspects; Study on security aspects of the 5G Service Based Architecture (SBA) (Release 16); 103 total pages.
3rd Generation Partnership Project; Technical Specification Group Services and System Aspects; System architecture for the 5G System (5GS); Stage 2 (Release 16). 3GPP TS 23.501 V16.7.0 (Dec. 2020), total 450 pages.
Huawei, Hisilicon:"New solution for service access authorization within a NF Set." 3GPP TSG-SA WG3 Meeting #95 Reno (US), May 6-10, 2019. S3-191416, total 3 pages.
Cablelabs, Mavenir et al:"Client authentications in token-based authorization for indirect communication." 3GPP TSG-SA3 Meeting #99e e-meeting, May 11-15, 2020. S3-201081, total 4 pages.
3GPP TS 23.502 V16.7.1 (Jan. 2021), 3rd Generation Partnership Project; Technical Specification Group Services and System Aspects; Procedures for the 5G System (5GS); Stage 2 (Release 16), total 598 pages.
D. Hardt, Ed. et al., The OAuth 2.0 Authorization Framework, RFC 6749, Oct. 2012, total 63 pages.
M. Jones et al., JSON Web Signature (JWS), RFC 7515, May 2015, total 118 pages.

* cited by examiner

SERVICE AUTHORIZATION METHOD AND SYSTEM, AND COMMUNICATION APPARATUS

CROSS-REFERENCE TO RELATED APPLICATIONS

This application is a continuation of International Application No. PCT/CN2021/077134, filed on Feb. 21, 2021, the disclosure of which is hereby incorporated by reference in its entirety.

TECHNICAL FIELD

This application generally relates to the field of communication technologies, and in particular, to a service authorization method and system, and a communication apparatus.

BACKGROUND

To provide higher flexibility and improved modularization in fifth generation (5G) service-base architectures, an enhanced 5th generation (5G) service-based architecture has been. The enhanced 5G service-based architecture provides better support automation and a higher reliability of a network function service. A service communication proxy (SCP) network element has been introduced in the enhanced 5G service-based architecture. The SCP network element is configured to route and forward signaling at a service-based interface.

However, in the service-based architecture in which the SCP network element is introduced, how to improve security of a service authorization is an urgent technical problem to be resolved.

SUMMARY

Embodiments of this application provide for a service authorization method and system, and a related communication apparatus, to improve a security for service authorization.

According to a first aspect, an embodiment of this application provides a service authorization method. The method includes that a first network element obtains a first access token from a token generation network element. The first access token indicates that a network function (NF) service consumer network element has permission to access a specified service provided by an NF service producer network element belonging to a specified service domain. The first access token includes an identifier of the NF service consumer network element, an identifier of the specified service, and first service domain information associated with the specified service domain. The first network element sends a first service request for the specified service to a second network element, where the first service request includes the first access token.

In this technical solution, the first service domain information is carried in the first access token, so that the NF service producer network element can determine, based on the first service domain information, whether the NF service consumer network element has permission to access a service provided by the NF service producer network element. This arrangement provides for service domain-based access control, which improves security of service authorization.

In an implementation, the first service domain information indicates a service domain to which the NF service consumer network element belongs, or indicates a service domain to which an NF service producer network element that the NF service consumer network element is allowed to access belongs.

In an implementation, the method is applied to an indirect communication scenario. The first network element may send the first service request for the specified service to the second network element in the following implementation: the first network element sends the first service request for the specified service to the second network element via a first service communication proxy (SCP) network element.

In an implementation, the first network element may obtain the first access token from the token generation network element in the following implementation: the first network element sends a token obtaining request to the token generation network element via the first SCP network element, where the token obtaining request includes the identifier of the NF service consumer network element and the identifier of the specified service. The first network element receives a token obtaining response from the token generation network element via the first SCP network element, where the token obtaining response includes the first access token.

In an implementation, the first network element may obtain the first access token from the token generation network element in the following implementation: the first network element sends a token obtaining request to the token generation network element, where the token obtaining request includes the identifier of the NF service consumer network element and the identifier of the specified service. The first network element receives a token obtaining response from the token generation network element, where the token obtaining response includes the first access token.

In an implementation, the token obtaining response further includes a second access token. The second access token indicates that the NF service consumer network element has permission to access the first SCP network element.

In this technical solution, an authorization check is performed by the first SCP network element on the NF service consumer network element. This improves security of the service authorization.

In an implementation, the first network element may send the first service request for the specified service to the second network element via the first SCP network element in the following implementation: the first network element sends a second service request for the specified service to the first SCP network element, where the second service request includes the first access token and the second access token. The second access token is used by the first SCP network element to determine that the NF service consumer network element has permission to access the first SCP network element, and send the first service request for the specified service to the second network element in response to the second service request.

In an implementation, the first service request further includes a third access token, and the third access token indicates that the first SCP network element has permission of a communication proxy.

In this technical solution, the authorization check is performed on the first SCP network element. This improves security of the service authorization.

In an implementation, the token obtaining request includes indication information, and the indication information indicates that the NF service consumer network element requests obtaining a token including the first service domain information.

In an implementation, the first network element is the NF service consumer network element or the second SCP network element, and the second network element is the NF service consumer network element.

In an implementation, the token generation network element is a network repository function (NRF) network element.

In an implementation, the first access token further includes an identifier of the NF service producer network element or a type of the NF service producer network element.

In an implementation, the first access token further includes one or more of the following: an NF type of the NF service producer network element, an expiration time, a single network slice selection assistance information (S-NSSAI) list or a network slice instance identifier (NSI ID) list of an instance of the NF service producer network element, or an identifier of an NF set to which the NF service producer network element belongs.

According to a second aspect, an embodiment of this application provides another service authorization method. The method includes that a second network element receives a first service request, where the first service request includes a first access token. The first access token indicates that an NF service consumer network element has permission to access a specified service provided by an NF service producer network element belonging to a specified service domain. The first access token includes an identifier of the NF service consumer network element, an identifier of the specified service, and first service domain information associated with the specified service domain. The second network element sends a first service response, where the first service response is used to respond to the first service request.

In this technical solution, the first service domain information is carried in the first access token, so that the NF service producer network element can determine, based on the first service domain information, whether the NF service consumer network element has permission to access a service provided by the NF service producer network element. This implements a service domain-based access control, which improves security of the service authorization.

In an implementation, the second network element is the NF service producer network element, and the method further includes that the second network element determines, based on the first access token, that the NF service consumer network element has permission to access a service provided by the NF service producer network element.

In an implementation, the first service domain information indicates a service domain to which the NF service consumer network element belongs. The second network element may determine, based on the first access token, that the NF service consumer network element has permission to access the service provided by the NF service producer network element. The second network element determines, based on the service domain to which the NF service consumer network element belongs and service domain information configured in the second network element, that the NF service consumer network element has permission to access the service provided by the NF service producer network element.

In an implementation, the first service domain information indicates a service domain to which an NF service producer network element that the NF service consumer network element is allowed to access belongs. The second network element may determine, based on the first access token, that the NF service consumer network element has permission to access the service provided by the NF service producer network element. The second network element determines, based on the service domain to which the NF service producer network element belongs and the service domain to which the NF service producer network element that the NF service consumer network element is allowed to access belongs, that the NF service consumer network element has permission to access the service provided by the NF service producer network element.

In an implementation, the method is applied to an indirect communication scenario, the first service request is from a first SCP network element, the first service request further includes a third access token, and the third access token indicates that the first SCP network element has permission of a communication proxy. The method further includes that the second network element determines, based on the third access token, that the first SCP network element has permission to send the first service request to the second network element.

In this technical solution, an authorization check is performed on the first SCP network element. This improves security of the service authorization.

In an implementation, the second network element is the NF service consumer network element.

In an implementation, the first access token further includes one or more of the following: an NF type of the NF service producer network element, an expiration time, a S-NSSAI list or a NSI ID list of an instance of the NF service producer network element, or an identifier of an NF set to which the NF service producer network element belongs.

According to a third aspect, an embodiment of this application provides still another service authorization method. The method includes that a token generation network element receives a token obtaining request, and generates a first access token in response to the token obtaining request. The token obtaining request includes an identifier of a NF service consumer network element and an identifier of a specified service. The first access token indicates that the NF service consumer network element has permission to access a specified service provided by an NF service producer network element belonging to a specified service domain. The first access token includes the identifier of the NF service consumer network element, the identifier of the specified service, and first service domain information associated with the specified service domain. The token generation network element sends a token obtaining response, where the token obtaining response includes the first access token.

In this technical solution, the first service domain information is carried in the first access token, so that the NF service producer network element can determine, based on the first service domain information, whether the NF service consumer network element has permission to access a service provided by the NF service producer network element. This implements service domain-based access control, which improves security of the service authorization.

In an implementation, the first service domain information indicates a service domain to which the NF service consumer network element belongs, or indicates a service domain to which an NF service producer network element that the NF service consumer network element is allowed to access belongs.

In an implementation, the token obtaining request includes indication information, and the indication information indicates that the NF service consumer network element requests obtaining a token including the first service domain information. The token generation network element may generate the first access token based on the indication information.

In an implementation, the token generation network element may generate the first access token when a local policy of the token generation network element supports generation of a token including the first service domain information.

In an implementation, the token generation network element may generate the first access token based on one or more of an NF type of the NF service consumer network element, an NF type of the NF service producer network element, configuration information of the NF service consumer network element, or configuration information of the NF service producer network element.

In an implementation, the token obtaining request is from the NF service consumer network element. The token generation network element may send the token obtaining response to the NF service consumer network element.

In this technical solution, the NF service consumer network element may directly request the first access token from the token generation network element.

In an implementation, the token obtaining request is from a first SCP network element. The token generation network element may send the token obtaining response to the first SCP network element.

In this technical solution, the NF service consumer network element may request, via the first SCP network element, the first access token from the token generation network element.

In an implementation, before the token generation network element generates the first access token, the method may further include that the token generation network element determines that one or more of the following conditions are met: the NF service consumer network element and the first SCP network element belong to a same service domain, service domains served by the first SCP network element include the service domain to which the NF service consumer network element belongs, NF sets served by the first SCP network element include an NF set to which the NF service consumer network element belongs, or slices served by the first SCP network element include a slice to which the NF service consumer network element belongs.

In an implementation, the method further includes that the token generation network element generates a third access token, where the third access token indicates that the first SCP network element has permission of a communication proxy. The token generation network element sends the third access token to the first SCP network element.

In this technical solution, an authorization check can be performed on the first SCP network element through the third access token. This improves security of the service authorization.

In an implementation, the method further includes that the token generation network element generates a second access token. The second access token indicates that the NF service consumer network element has permission to access the first SCP network element.

In this technical solution, the first SCP network element can perform an authorization check on the NF service consumer network element through the second access token. This improves security of the service authorization.

In an implementation, the token obtaining response further includes the second access token.

In an implementation, the token generation network element is a NRF network element.

According to a fourth aspect, an embodiment of this application provides a communication apparatus. The communication apparatus has some or all functions of the first network element in the method examples in the first aspect. For example, the functions of the communication apparatus may include functions of some or all of embodiments of this application, or may have a function to independently implement any embodiment of this application. The functions may be implemented by hardware, or may be implemented by hardware executing corresponding software. The hardware or the software includes one or more units or modules corresponding to the functions.

In an implementation, a structure of the communication apparatus may include a transceiver module and a processing module. The processing module is configured to support the communication apparatus in performing a corresponding function in the foregoing method. The transceiver module is configured to support communication between the communication apparatus and another device. The communication apparatus may further include a storage module. The storage module is configured to be coupled to the processing module and the transceiver module, and store a computer program and data that are necessary for the communication apparatus.

In an implementation, the communication apparatus includes a processing module configured to obtain a first access token from a token generation network element via a transceiver module. The first access token indicates that an NF service consumer network element has permission to access a specified service provided by an NF service producer network element belonging to a specified service domain, and the first access token includes an identifier of the NF service consumer network element, an identifier of the specified service, and first service domain information associated with the specified service domain. The communication apparatus further includes a transceiver module configured to send a first service request for the specified service to a second network element, where the first service request includes the first access token.

In an example, the processing module may be a processor, the transceiver module may be a transceiver, and the storage module may be a memory.

In an implementation, the communication apparatus includes a processor, configured to obtain a first access token from a token generation network element via a transceiver. The first access token indicates that an NF service consumer network element has permission to access a specified service provided by an NF service producer network element belonging to a specified service domain, and the first access token includes an identifier of the NF service consumer network element, an identifier of the specified service, and first service domain information associated with the specified service domain. The communication apparatus further includes the transceiver that is further configured to send a first service request for the specified service to a second network element, where the first service request includes the first access token.

According to a fifth aspect, an embodiment of this application provides another communication apparatus. The communication apparatus has some or all functions of the second network element in the method examples in the second aspect. For example, the functions of the communication apparatus may include functions of some or all of embodiments of this application, or may have a function to independently implement any embodiment of this application. The functions may be implemented by hardware, or may be implemented by hardware executing corresponding software. The hardware or the software includes one or more units or modules corresponding to the functions.

In an implementation, a structure of the communication apparatus may include a processing module and a transceiver module. The processing module is configured to support the communication apparatus in performing a corresponding function in the foregoing method. The transceiver module is configured to support communication between the communication apparatus and another device. The communication apparatus may further include a storage module. The storage module is configured to be coupled to the processing module and the transceiver module, and store a computer program and data that are necessary for the communication apparatus.

In an implementation, the communication apparatus includes a transceiver module that is configured to receive a first service request and send a first service response. The first service response is used to respond to the first service request. The first service request includes a first access token. The first access token indicates that an NF service consumer network element has permission to access a specified service provided by an NF service producer network element belonging to a specified service domain. The first access token includes an identifier of the NF service consumer network element, an identifier of the specified service, and first service domain information associated with the specified service domain.

In an example, the processing module may be a processor, the transceiver module may be a transceiver, and the storage module may be a memory.

In an implementation, the communication apparatus includes a transceiver, configured to receive a first service request and send a first service response. The first service response is used to respond to the first service request. The first service request includes a first access token. The first access token indicates that an NF service consumer network element has permission to access a specified service provided by an NF service producer network element belonging to a specified service domain. The first access token includes an identifier of the NF service consumer network element, an identifier of the specified service, and first service domain information associated with the specified service domain.

According to a sixth aspect, an embodiment of this application provides still another communication apparatus. The communication apparatus has some or all functions of the token generation network element in the method examples in the third aspect. For example, the functions of the communication apparatus may include functions of some or all of embodiments of this application, or may have a function to independently implement any embodiment of this application. The functions may be implemented by hardware, or may be implemented by hardware executing corresponding software. The hardware or the software includes one or more units or modules corresponding to the functions.

In an implementation, a structure of the communication apparatus may include a processing module and a transceiver module. The processing module is configured to support the communication apparatus in performing a corresponding function in the foregoing method. The transceiver module is configured to support communication between the communication apparatus and another device. The communication apparatus may further include a storage module. The storage module is configured to be coupled to the processing module and the transceiver module, and store a computer program and data that are necessary for the communication apparatus.

In an implementation, the communication apparatus includes a transceiver module that is configured to receive a token obtaining request, where the token obtaining request includes an identifier of an NF service consumer network element and an identifier of a specified service. The communication apparatus further includes a processing module that is configured to generate a first access token in response to the token obtaining request. The first access token indicates that the NF service consumer network element has permission to access a specified service provided by an NF service producer network element belonging to a specified service domain. The first access token includes the identifier of the NF service consumer network element, the identifier of the specified service, and first service domain information associated with the specified service domain. The transceiver module is further configured to send a token obtaining response, where the token obtaining response includes the first access token.

In an example, the processing module may be a processor, the transceiver module may be a transceiver, and the storage module may be a memory.

In an implementation, the communication apparatus includes a transceiver that is configured to receive a token obtaining request. The token obtaining request includes an identifier of an NF service consumer network element and an identifier of a specified service. The communication apparatus further includes a processor that is configured to generate a first access token in response to the token obtaining request. The first access token indicates that the NF service consumer network element has permission to access a specified service provided by an NF service producer network element belonging to a specified service domain. The first access token includes the identifier of the NF service consumer network element, the identifier of the specified service, and first service domain information associated with the specified service domain. The transceiver is further configured to send a token obtaining response, where the token obtaining response includes the first access token.

According to a seventh aspect, an embodiment of this application provides a service authorization system. The system includes one or more communication apparatuses according to the fourth aspect to the sixth aspect.

According to an eighth aspect, an embodiment of the present disclosure provides a computer-readable storage medium. The computer-readable storage medium stores a computer program, and the computer program includes program instructions. When the program instructions are executed by a communication apparatus, the communication apparatus is enabled to perform the method according to the first aspect.

According to a ninth aspect, an embodiment of the present disclosure provides a computer-readable storage medium. The computer-readable storage medium stores a computer program, and the computer program includes program instructions. When the program instructions are executed by a communication apparatus, the communication apparatus is enabled to perform the method according to the second aspect.

According to a tenth aspect, an embodiment of the present disclosure provides a computer-readable storage medium. The computer-readable storage medium stores a computer program, and the computer program includes program instructions. When the program instructions are executed by a communication apparatus, the communication apparatus is enabled to perform the method according to the third aspect.

According to an eleventh aspect, this application further provides a computer program product including a computer program. When the computer program product runs on a computer, the computer is enabled to perform the method according to the first aspect.

According to a twelfth aspect, this application further provides a computer program product including a computer program. When the computer program product runs on a computer, the computer is enabled to perform the method according to the second aspect.

According to a thirteenth aspect, this application further provides a computer program product including a computer program. When the computer program product runs on a computer, the computer is enabled to perform the method according to the third aspect.

DESCRIPTION OF EMBODIMENTS

To better understand technical solutions provided in embodiments of this application, technical terms in embodiments of this application are first described.

Figure 1A:
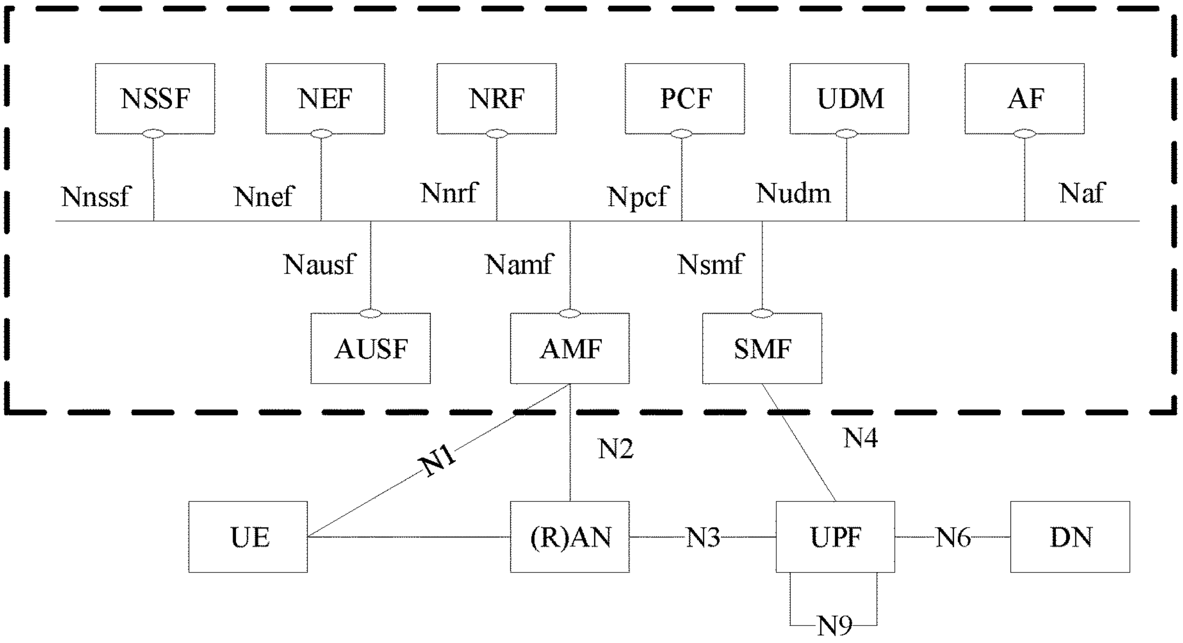
FIG. 1*a* is a schematic diagram of a fifth generation (5G) service-based architecture.

(1) Fifth Generation (5G) Service-Based Architecture and Enhanced 5G Service-Based Architecture Refer to a 5G service-based architecture shown in FIG. 1*a*. The architecture may include an access network and a core network, and optionally, may further include user equipment (UE).

The UE is a device having a wireless transceiver function, and may be deployed on the land, including an indoor or outdoor device, a hand-held device, a wearable device, or a vehicle-mounted device, or may be deployed on the water (for example, on a ship), or may be deployed in the air (for example, on a plane, a balloon, or a satellite). The UE may be a mobile phone, a tablet computer (e.g., Pad), a computer with a wireless transceiver function, a virtual reality (VR) terminal device, an augmented reality (AR) terminal device, a wireless terminal in industrial control, a vehicle-mounted terminal device, a wireless terminal in self-driving, a wireless terminal in remote medical, a wireless terminal in a smart grid, a wireless terminal in transportation safety, a wireless terminal in a smart city, a wireless terminal in a smart home, a wireless terminal device, or the like. The UE may also sometimes be referred to as a terminal, a terminal device, an access terminal device, a vehicle-mounted terminal, an industrial control terminal, a UE unit, a UE station, a mobile station, a mobile console, a remote station, a remote terminal device, a mobile device, a UE proxy, a UE apparatus, or the like. The UE may be fastened or mobile.

The access network is configured to implement an access-related function, may provide a network access function for an authorized user in a specific area, and can determine transmission tunnels of different quality based on a user level, a service requirement, or the like, to transmit user data. The access network forwards a control signal and user data between the terminal device and the core network.

The access network may include an access network device. The access network device may be a device that provides access for the terminal device, and may include a radio access network (RAN) device and an AN device. The (R)AN device is responsible for radio resource management, quality of service (QoS) management, data compression and encryption, or the like on an air interface side. The RAN device may include base stations in various forms, such as a macro base station, a micro base station (which may also be referred to as a small cell), a relay station, an access point, and a balloon station. In systems using different radio access technologies, names of a device having a base station function may be different. For example, in a 5G system, the device is referred to as a RAN or a next generation node base station (gNB). In a long term evolution (LTE) system, the device is referred to as an evolved NodeB (e.g., eNB or eNodeB).

The core network is responsible for maintaining subscription data of a mobile network, and providing functions such as session management, mobility management, policy management, and security authentication for the UE. The core network may include the following network elements: a user plane function (UPF), an authentication server function (AUSF), an access and mobility management function (AMF), a session management function (SMF), a network slice selection function (NSSF), a network exposure function (NEF), a network function repository function (NRF), a policy control function (PCF), unified data management (UDM), and an application function (AF).

The AMF network element is responsible for mobility management in the mobile network, such as user location update, registration of a user with a network, and user switching. The SMF network element is responsible for session management in the mobile network, such as session establishment, modification, and release. A specific function is, for example, allocating an internet protocol (IP) address to a user, or selecting the UPF that provides a packet forwarding function. The UPF network element is responsible for forwarding and receiving user data. The UPF network element may receive user data from a data network, and transmit the user data to the UE via an access network device. Alternatively, the UPF network element may receive user data from the UE via an access network device, and forward the user data to the data network. The PCF network element supports providing a unified policy framework to control network behavior, and providing a policy rule to a control-layer network function, and is responsible for obtaining policy decision-related subscription information of a user. The PCF network element may provide a policy, for example, a QoS policy or a slice selection policy, for the AMF network element and the SMF network element. The AUSF network element is configured to perform security authentication on the UE. The NSSF network element is configured to select a network slice for the UE. The NEF network element is configured to support capability and event exposure. The UDM network element is configured to store user data, such as subscription data, and authentication/authorization data. The AF network element supports interacting with a third generation partnership project (3GPP) core network to provide a service, for example, affecting data routing decision-making and a policy control function, or providing some third-party services for a network side.

The NRF network element provides service registration, discovery, and authorization, and maintains available network function (NF) instance information, to implement on-demand configuration of network functions and services and interconnection between NFs. The service registration indicates that the NF network element can provide a service only after registering with the NRF network element. Service discovery indicates that when an NF network element needs another NF network element to provide a service for the NF network element, the NRF network element performs service discovery to discover an expected NF network element that provides a service for the NF network element. For example, when an NF network element 1 needs an NF network element 2 to provide a service for the NF network element 1, the NRF network element first needs to perform service discovery to discover the NF network element 2.

The data network (DN) is configured to provide a service for the user. The data network may be a private network, for example, a local area network. The data network may alternatively be an external network that is not controlled by an operator, for example, Internet. The data network may alternatively be a dedicated network jointly deployed by operators, for example, a network that provides an IP multimedia subsystem (IMS). The UE may access the DN through an established protocol data unit (PDU) session.

In the architecture shown in FIG. 1*a*, network elements in a dashed box are service-based NF network elements, interfaces between the NF network elements are service-based interfaces, and messages exchanged between the NF network elements are service-based messages.

Figure 1B:
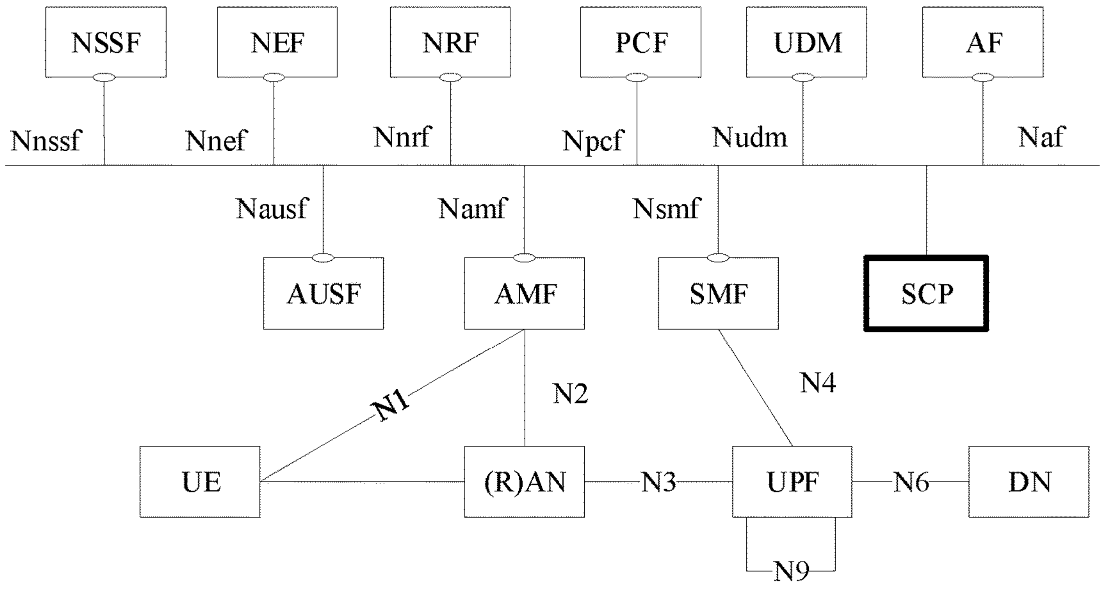
FIG. 1*b* is a schematic diagram of an enhanced 5G service-based architecture.

An enhanced 5G service-based architecture shown in FIG. 1*b* is added with a service communication proxy (SCP) network element based on the architecture shown in FIG. 1*a*. The SCP network element is configured to route and forward service-based interface signaling. It may also be understood that the SCP network element may provide a routing and forwarding service for a sender of the service-based interface signaling. The sender of the service-based interface signaling may be the NF network element or the like. Information about a corresponding SCP network element may be configured on the NF network element, and the SCP network element may provide a message forwarding service for the NF network element. When the NF network element needs to use the SCP network element for communication, the NF network element may send a message to the configured SCP network element. A quantity of SCP network elements in FIG. 1*b* is used as an example, and does not constitute a limitation.

An SCP domain is introduced in the enhanced 5G service-based architecture. The SCP domain is used to define a group, and the group may include one or more SCP network elements, and may further include zero or more NF instances. The SCP network element in the group can directly interact with another SCP network element in the group. The SCP network element in the group can directly interact with an NF network element in the group without interaction with an intermediate SCP network element. The SCP network element in the SCP domain may be exclusive to a slice (one SCP network element may belong to only one network slice). In other words, NF instances served by the SCP network element belong to a same network slice. The SCP network element in the SCP domain may alternatively be shared by slices (one SCP network element may belong to a plurality of network slices). In other words, NF instances served by one SCP network element may belong to different network slices.

For the NF network element that uses the SCP network element for communication, configuration information (e.g., a profile) of the NF network element may include information about an SCP domain to which the NF network element belongs. Configuration information of the SCP network element may include information about an SCP domain to which the SCP network element belongs, and one SCP network element may belong to a plurality of SCP domains.

(2) Direct Communication Scenario

In FIG. 1*a*, NF network elements in the dashed box directly exchange messages, or messages are directly exchanged for NF services. This interaction manner is an example of direct communication. Among two parties participating in the direct communication, a party requesting a service may be referred to as a consumer end, a consumer network element, a service consumer network element, a consumer, a user, a requester side, or a requester, and a party providing a service may be referred to as a producer end, a producer network element, a service producer network element, a provider, a producer, or a responder.

Figure 2A:
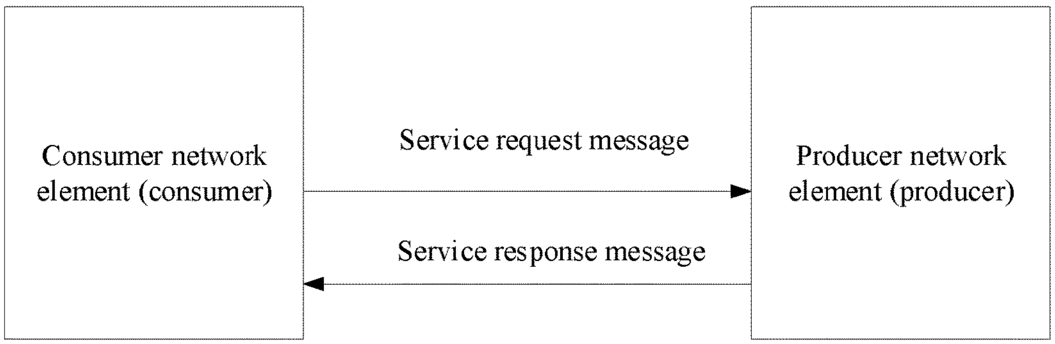
FIG. 2*a* is a schematic diagram of a direct communication scenario.

The direct communication scenario may include two modes. In one mode, the NRF network element does not need to participate, as shown in FIG. 2*a*. The other mode is based on the NRF network element, as shown in FIG. 2*b*.

In FIG. 2*a*, information about a producer network element is configured on a consumer network element. When the consumer network element needs to communicate, the consumer network element selects a producer network element based on a configuration on the consumer network element, and sends a service request message to the selected producer network element.

Figure 2B:
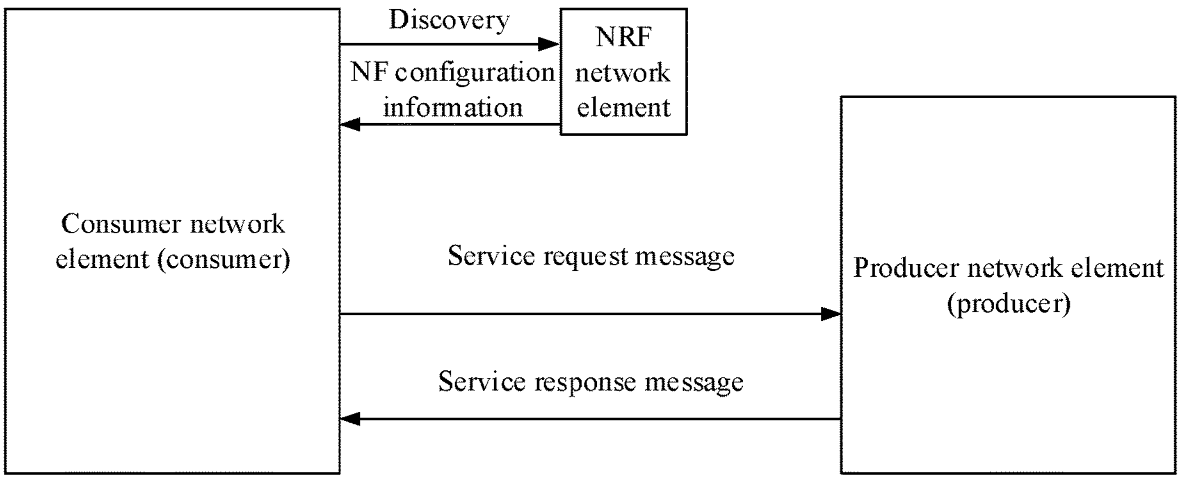
FIG. 2*b* is another schematic diagram of a direct communication scenario.

In FIG. 2*b*, the consumer network element queries the NRF network element for producer network element discovery, to discover information about an available producer network element, selects a producer network element based on a discovery result, and sends a service request message to the selected producer network element.

(3) Indirect Communication Scenario

An indirect communication scenario is introduced in the enhanced 5G service-based architecture. That is, NF network elements (or NF services) exchange messages via one or more SCP network elements. The indirect communication scenario may also be referred to as a non-direct communication scenario.

Figure 3A:
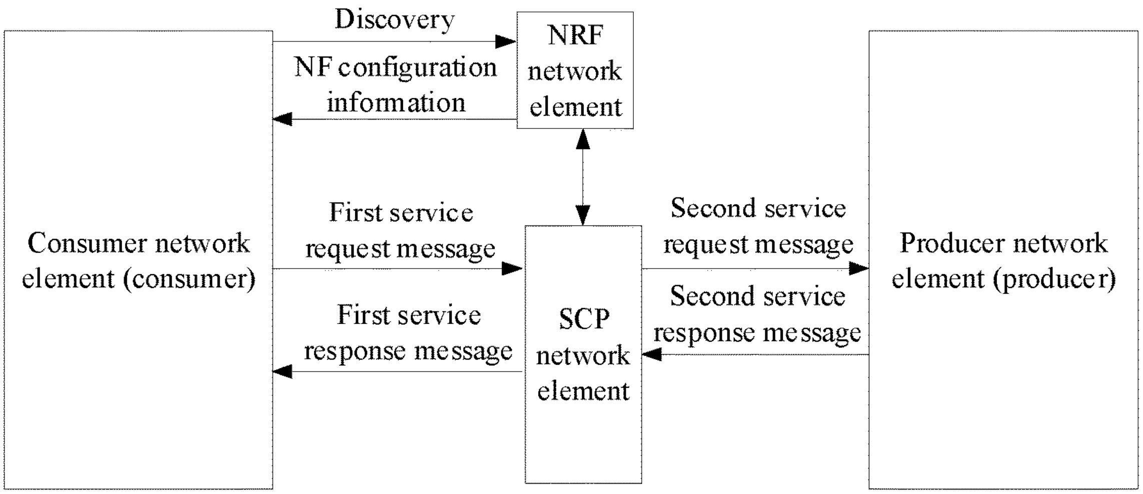
FIG. 3*a* is a schematic diagram of an indirect communication scenario.

The indirect communication scenario may include two modes. In one mode, proxy discovery is not required. To be specific, a consumer network element directly communicates with the NRF network element, to perform a service discovery procedure to select a corresponding service producer network element. An SCP network element does not need to participate in the service discovery procedure. The mode may be referred to as mode C, as shown in FIG. 3*a*. Another mode is based on proxy discovery. To be specific, a consumer network element does not directly communicate with the NRF network element, and an SCP network element acts as a proxy of the consumer network element to communicate with the NRF network element, to perform a service discovery procedure to select a corresponding service producer network element. The mode may be referred to as mode D, as shown in FIG. 3*b*.

In FIG. 3*a*, the consumer network element discovers information about an available producer network element by querying the NRF network element (that is, the consumer network element requests the NRF network element to perform a discovery procedure for a "producer network element"), selects a producer network element based on a discovery result, and requests a service from the selected producer network element via an SCP network element. Specifically, (1) the consumer network element sends a discovery instruction to the NRF network element, and obtains a discovery result from the NRF network element. The discovery result includes NF configuration information (e.g., NF profiles) of one or more available producer network elements. (2) The consumer network element selects an NF set as a set of producer network elements based on the NF configuration information of the available producer network elements, or selects a specific NF instance in a specific NF set as the producer network element. (3) The consumer network element sends a first service request message to the SCP network element, where the first service request message includes information about a selected producer network element, and the information may be used to indicate one NF set or one specific NF instance. (4) The SCP network element receives the first service request message from the consumer network element. When information about the selected producer network element points to an NF set, the SCP network element selects an NF instance from the NF set as the producer network element, and sends a second service request message to the producer network element. When the information about the selected producer network element points to a specific NF instance, the SCP network element sends a second service request message to the NF instance. (5) The producer network element receives the second service request message, and sends a second service response message to the SCP network element. Then, the SCP network element sends a first service response message to the consumer network element.

Optionally, the SCP network element may interact with the NRF network element, to obtain a parameter (for example, a location or a capacity) used to select a producer network element. The SCP network element selects a producer network element based on the obtained parameter, and routes the second service request message to the selected producer network element.

Figure 3B:
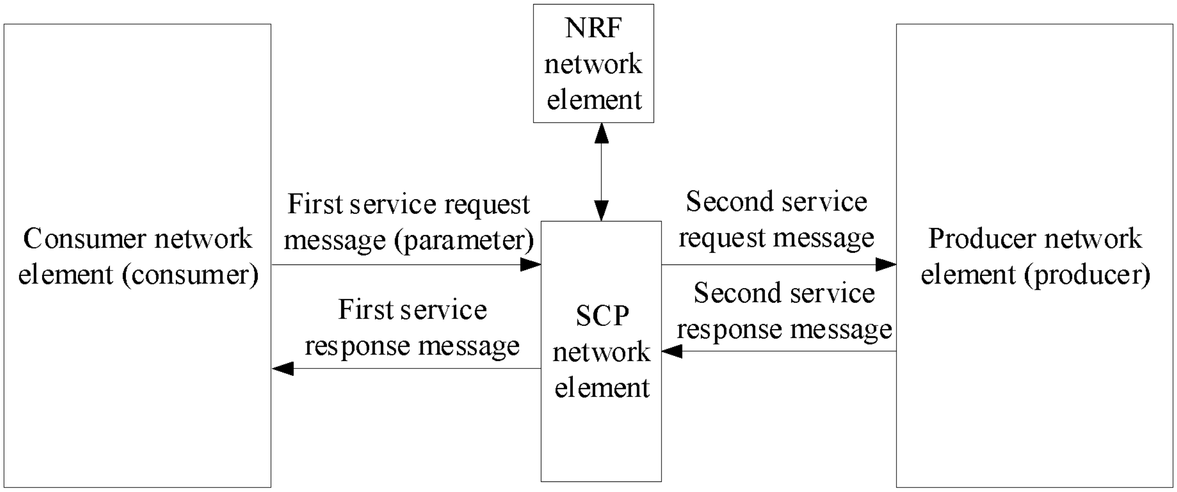
FIG. 3*b* is another schematic diagram of an indirect communication scenario.

It should be noted that, a quantity of SCP network elements participating in the indirect communication in FIG. 3*a* and FIG. 3*b* is merely used as an example, and does not constitute a limitation. It should be further noted that, in the indirect communication scenario, a service request message (for example, the first service request message in FIG. 3*a* or FIG. 3*b*) sent by the consumer network element may be transmitted to the producer network element in a non-transparent transmission manner, and a service response message (for example, the second service response message in FIG. 3*a* or FIG. 3*b*) sent by the producer network element may be transmitted to the consumer network element in a non-transparent transmission manner. In other words, the SCP network element may modify the received service request message (for example, the first service request message in FIG. 3*a* or FIG. 3*b*), for example, modify a message header and/or a message body of the service request message, and then route a modified service request message (for example, the second service request message in FIG. 3*a* or FIG. 3*b*) to the producer network element.

In FIG. 3*b*, the consumer network element does not query the NRF network element to perform discovery and selection of a producer network element, but instead directly sends the first service request message to the SCP network element. Specifically, (1) the consumer network element directly sends the first service request message to the SCP network element, where the first service request message includes a parameter used to discover a producer network element and select a producer network element. (2) The SCP network element queries the NRF network element based on the parameter to obtain a discovery result, and selects a producer network element based on the discovery result. (3) The SCP network element sends the second service request message to the selected producer network element. (4) The producer network element receives the second service request message, and sends the second service response message to the SCP network element. Then, the SCP network element sends the first service response message to the consumer network element.

(4) Service Authorization

In a service-based architecture, the NRF network element needs to perform an authorization check on the NF network element to check whether the NF network element has permission to obtain a requested service in the following three cases: (1) the NF network element requests the NRF network element to perform NF network element discovery; (2) the NF network element requests registration with the NRF network element; and (3) the NF network element requests the NRF network element to generate a token. For example, the NF network element requests the NRF network element to generate a token of a specific type, and the NRF network element checks whether the NF network element has permission to obtain the token of this type. When an NF service consumer network element requests a service from an NF service producer network element, the NF service producer network element needs to perform the authorization check on the NF service consumer network element, that is, check whether the NF service consumer network element has permission to obtain the requested service. The authorization check performed by the NRF network element and the authorization check performed by the NF service producer network element can ensure that a service obtained by the NF service consumer network element is an authorized service, preventing unauthorized or illegal use of the service. In this application, a party that requests a service is referred to as an NF service consumer network element, and a party that provides a service is referred to as an NF service producer network element. For example, the NF service consumer network element is an AMF network element, and the NF service producer network element is an SMF network element. The AMF network element requests a protocol data unit (PDU) session service from the SMF network element. For another example, the NF service consumer network element is the SMF network element, the NF service producer network element is a PCF network element. The SMF network element requests a session management (SM) policy control service from the PCF network element.

In a possible implementation, a static authorization manner is used when the NF service producer network element performs an authorization check on a service requested by the NF service consumer network element, or when the NRF network element performs the authorization check on the NF service consumer network element. In the static authorization manner, the NRF network element or the NF service producer network element authorizes the NF service consumer network element based on a local authorization policy.

In another possible implementation, an oAuth 2.0-based authorization manner is used when the NF service producer network element performs an authorization check on the service requested by the NF service consumer network element. In the oAuth 2.0-based authorization manner, the NF service consumer network element obtains an access token and includes the access token in a service request, and the NF service producer network element performs the authorization check on the service request based on the access token.

(5) Access Token

Access tokens may be classified into three types based on a granularity of a service to be accessed using the access token. An access token of type 1 is an access token based on an NF type granularity, an access token of type 2 is an access token based on a granularity of an instance of the NF service producer network element, and an access token of type 3 is an access token based on a granularity of a service instance of the NF service producer network element. The access token of type 1 is used to access a service of an NF service producer network element of a specific NF type. The access token of type 2 is used to access a service of a specific instance of the NF service producer network element. The access token of type 3 is used to access a service of a specific service instance of the NF service producer network element. The access token includes claims.

Figure 4A:
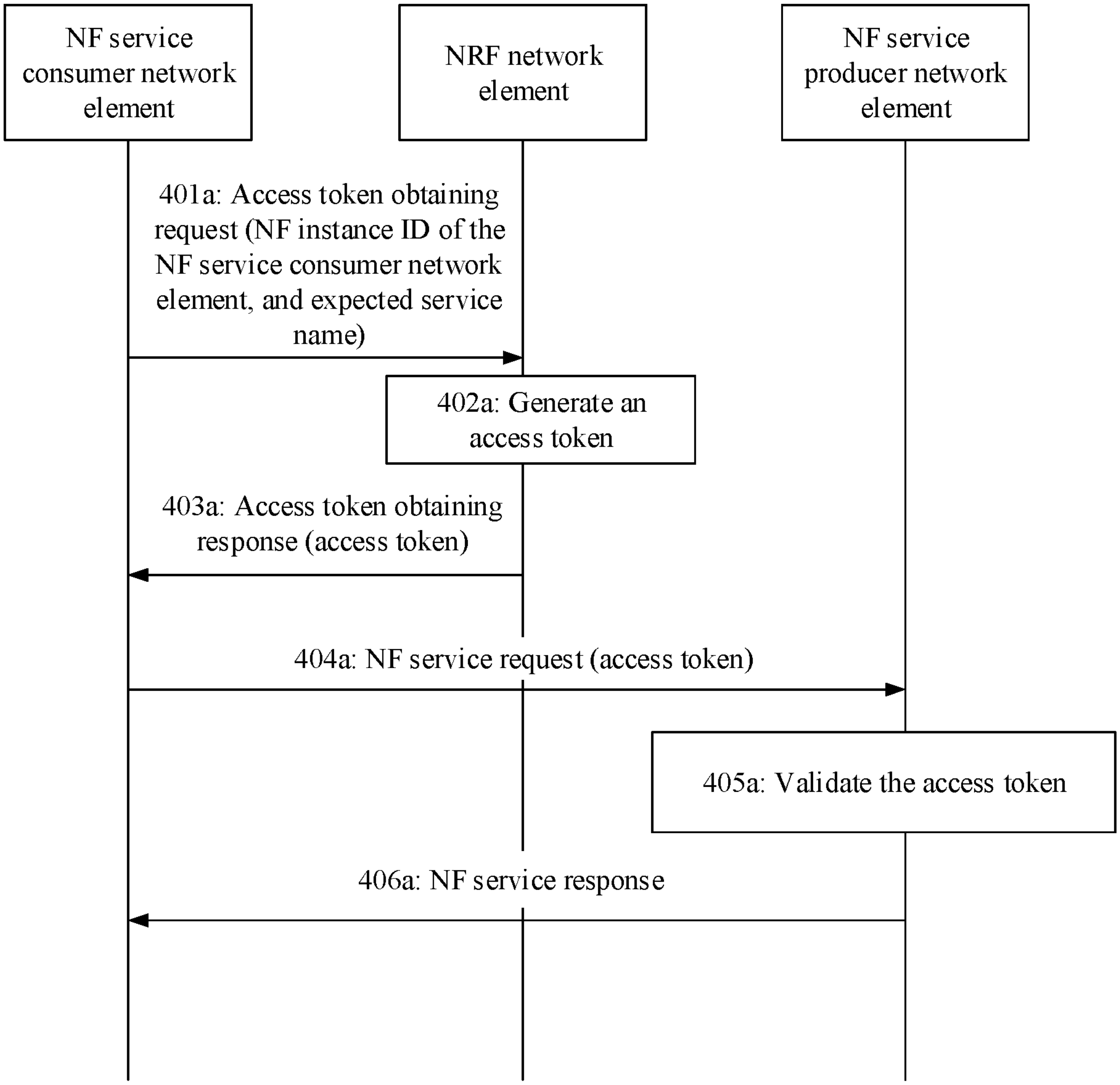
FIG. 4*a* is a schematic diagram of a service authorization procedure based on an access token of type 1.

(5.1) Service Authorization Procedure Based on an Access Token of Type 1:

For example, for the service authorization procedure based on the access token of type 1, refer to FIG. 4*a*. The procedure may include step 401*a* to step 406*a*. Step 401*a* to step 403*a* may be understood as a process in which an NF service consumer network element obtains an access token from an NRF network element. Step 404*a* to step 406*a* may be understood as a process in which the NF service consumer network element uses the access token to request to access a service of an NF service producer network element. The NF service producer network element performs a service authorization check based on the access token.

Step 401*a*: The NF service consumer network element sends an access token obtaining request to the NRF network element. Correspondingly, the NRF network element receives the access token obtaining request from the NF service consumer network element.

The access token obtaining request is used to request an access token. In the procedure shown in FIG. 4*a*, the access token is used to access a service of an NF service producer network element of a specific NF type. For example, the access token is used to access a session service provided by an SMF network element.

The access token obtaining request may include one or more of the following parameters: an NF instance identifier (ID) of the NF service consumer network element, an expected service name, an NF type of the NF service consumer network element, or an NF type of a requested NF service producer network element. The NF instance ID of the NF service consumer network element is used to identify an instance of the NF service consumer network element. The expected service name, that is, excepted NF service name(s), is used to identify a service that the NF service consumer network element expects to access, for example, a session service. The access token obtaining request may include a plurality of expected service names. The NF type of the requested NF service producer network element means that the NF service consumer network element expects a network element belonging to the NF type to provide a service for the NF service consumer network element.

Optionally, the access token obtaining request may further include an additional scope (for example, a requested resource and/or a requested operation for a resource). The additional scope may be added to the access token obtaining request for services corresponding to a same service name, to further isolate access to a resource of the service producer network element and/or an operation on the resource by different NF service consumer network elements. For example, when the additional scope is an access and mobility subscription data type, when an AMF network element (which is used as an example of the service consumer network element herein) requests a user subscription service from a UDM network element (which is used as an example of the service producer network element herein), the AMF network element can obtain only user subscription data of the access and mobility subscription data type from the UDM network element.

Optionally, the access token obtaining request may further include a single network slice selection assistance information (S-NSSAI) list or a network slice instance identifier (NSI ID) list of an expected instance of the NF service producer network element, an NF set ID of the expected instance of the NF service producer network element, and an S-NSSAI list of the NF service consumer network element. The S-NSSAI is used to identify a network slice. The NSI ID is used to identify a network slice instance. The NF set ID is used to identify an NF set. An NF set is a group of interchangeable NF instances that support a same service and a same network slice. NF instances belonging to a same NF set may be geographically distributed, but can access same context data. That NF instances belonging to a same NF set are geographically distributed may indicate that the NF instances belonging to the same NF set are distributed at different geographical locations. The access token obtaining request may be, for example, Nnrf_AccessToken_Get_Request.

The NF service consumer network element and the NRF network element may belong to a same public land mobile network (PLMN).

Step 402*a*: The NRF network element generates an access token.

Optionally, before generating the access token, the NRF network element may first perform an authorization check on the NF service consumer network element. When the authorization check succeeds, the NRF network element generates the access token. When the authorization check fails, the NRF network element refuses to generate the access token for the NF service consumer network element.

Optionally, the NRF network element performs an authorization check on the NF service consumer network element in response to the access token obtaining request. That the NRF network element performs the authorization check on the NF service consumer network element may include authenticating, by the NRF network element, an identity of the NF service consumer network element, and when the authentication succeeds, verifying whether the NF service consumer network element has permission to access a requested service. The access token is generated when the NF service consumer network element has permission, so that a service obtained by the NF service consumer network element by using the access token is an authorized service, which prevents unauthorized use of the service.

That the NRF network element authenticates the identity of the NF service consumer network element may include verifying whether a parameter (for example, an NF type of the NF service consumer network element) carried in the access token obtaining request matches a public key certificate or NF configuration information of the NF service consumer network element. When the parameter matches the public key certificate or the NF configuration information, identity authentication succeeds; if the parameter does not match the public key certificate or the NF configuration information, identity authentication fails. Specifically, for example, the NRF network element may obtain the corresponding public key certificate from the NF service consumer network element, where the public key certificate includes information about the NF service consumer network element. The NRF network element compares the parameter (for example, the NF type of the NF service consumer network element) in the access token obtaining request with information included in the public key certificate. When the parameter is consistent with the information included in the public key certificate, identity authentication succeeds. When the parameter is inconsistent with the information included in the public key certificate, an identity authentication fails. Alternatively, for another example, the NRF network element obtains, based on the NF instance ID of the NF service consumer network element in the access token obtaining request, NF configuration information (namely, the NF configuration information of the NF service consumer network element) that is locally stored in the NRF network element and that is corresponding to the NF instance ID, and compares the parameter in the access token obtaining request, for example, the NF type of the NF service consumer network element, with an NF type in the NF configuration information. When the parameters are consistent, the identity authentication succeeds. When the parameters are inconsistent, the identity authentication fails.

The verifying, by the NRF network element, whether the NF service consumer network element has permission to access a requested service may include determining, by the NRF network element based on a service-related parameter (for example, an expected service name) carried in the access token obtaining request, the NF type of the NF service consumer network element, and the local configuration, whether the NF service consumer network element has permission to access the requested service. For example, the NF service consumer network element is the AMF network element, the NF service producer network element is the UDM network element, and the expected service name is obtaining subscription information. The NRF network element determines, based on the local configuration, that the AMF network element has permission to obtain subscription information from the UDM network element. In this case, the authorization check succeeds. For another example, the NF service consumer network element is a PCF network element, the NF service producer network element is the UDM network element, and the expected service name is obtaining subscription information. In this case, the NRF network element determines, based on the local configuration, that the PCF network element cannot obtain the subscription information from the UDM network element. Therefore, the authorization check fails. When the authorization check on the NF service consumer network element succeeds, the NRF network element generates an access token including claims.

The claims in the access token may include an NF instance ID of the NRF network element, the NF instance ID of the NF service consumer network element (NF Instance ID of the NF service consumer), an NF type of the NF service producer network element, an expected service name, and an expiration time. Optionally, the claims may further include an additional scope. Optionally, the claims may further include the S-NSSAI list or NSI ID list of the expected instance of the NF service producer network element, and the NF set ID of the expected instance of the NF service producer network element.

The NRF network element may perform integrity protection on the generated access token. For example, a message authentication code (MAC) value is generated for the access token by using a key shared with the NF service producer network element, or the generated access token is signed by using a private key. For a method of protecting the access token by using a signature and a MAC value, refer to a definition in RFC 7515.

Step 403*a*: The NRF network element sends an access token obtaining response to the NF service consumer network element. Correspondingly, the NF service consumer network element receives the access token obtaining response from the NRF network element. The access token obtaining response includes the access token.

After generating the access token, the NRF network element may send an access token obtaining response including the access token to the NF service consumer network element. The access token in the access token obtaining response is signed, or the access token obtaining response includes a MAC value of the access token. The access token obtaining response may be, for example, Nnrf_AccessToken_Get_Response. The access token obtaining response may further include another parameter, for example, expiration time and an allowed range.

When receiving the access token obtaining response, the NF service consumer network element may store the received access token for subsequent accessing a service of a same type before the expiration time expires. The accessing a service of a same type may include, for example, that a service name of a service that is expected to be subsequently accessed is the same as the expected service name in the access token obtaining request in step 401*a*. Alternatively, a service name of a service that is expected to be subsequently accessed is the same as the expected service name in the access token obtaining request in step 401*a*, and an NF type of a subsequently requested NF service producer network element is the same as the NF type of the NF service producer network element in the access token obtaining request in step 401*a*. In this case, the NF service consumer network element may access the expected service by using the access token obtained in step 403*a*.

When the authorization check on the NF service consumer network element fails, the access token obtaining response does not carry the access token, and indicates that the authorization check on the NF service consumer network element fails. Alternatively, the NRF network element returns an error message to the NF service consumer network element.

Step 404*a*: The NF service consumer network element sends an NF service request to the NF service producer network element. Correspondingly, the NF service producer network element receives the NF service request from the NF service consumer network element.

After obtaining the access token, the NF service consumer network element may send, to the NF service producer network element, an NF service request used to request an access service. The NF service request carries the access token obtained from the NRF network element.

Step 405*a*: The NF service producer network element verifies the access token.

After receiving the NF service request, the NF service producer network element verifies the access token in response to the NF service request, to determine whether the NF service consumer network element has permission to access the requested service, that is, determine whether to provide the requested service for the NF service consumer network element.

That the NF service producer network element verifies the access token may include performing integrity checking on the access token, and when the integrity checking succeeds, verifying the claims in the access token. The integrity checking includes that when the access token is signed, the NF service producer network element uses a public key of the NRF network element to verify the signature, so as to check the integrity of the access token. When the NF service request carries the MAC value of the access token, the NF service producer network element uses a key shared with the NRF network element to check the MAC value, so as to check the integrity of the access token. When the signature or the MAC value is successfully authenticated, the integrity checking succeeds.

The verifying, by the NF service producer network element, the claims in the access token may include but is not limited to the following steps: (1) It is verified whether an NF type of an NF service producer network element in the claims matches a type of the NF service producer network element, for example, whether the NF type of the NF service producer network element in the claims is the same as the type of the NF service producer network element. When the NF types are the same, verification on the NF type of the NF service producer network element in the claims succeeds. When the NF types are different, the verification fails. When the claims include an S-NSSAI list or an NSI ID list of an expected instance of the NF service producer network element, it is verified whether a network slice corresponding to the S-NSSAI list or the NSI ID list can be served. When the corresponding network slice can be served, verification on the S-NSSAI list or the NSI ID list in the claims succeeds. When the corresponding network slice cannot be served, the verification fails. (2) When the claims include an NF set ID of the expected instance of the NF service producer network element, it is verified whether the NF set ID matches an NF set ID to which the NF service producer network element belongs, for example, whether the NF set ID is the same as the NF set ID to which the NF service producer network element belongs. When the NF set IDs are the same, verification on the NF set ID in the claims succeeds. When the NF set IDs are different, the verification fails. (3) When the claims include an expected service name, it is verified whether the service name matches a requested service operation. When the service name matches the requested service operation, verification on the expected service name included in the claims succeeds. When the service name does not match the requested service operation, the verification fails. For example, the AMF network element requests a PDU session establishment service from the SMF network element, the request includes an access token, and an expected service name in claims in the access token includes a PDU session service. In this case, the PDU session service matches the PDU session establishment service requested by the AMF network element, and verification on the expected service name included in the claims succeeds. (4) When the claims include an additional scope, it is verified whether the additional scope matches a requested operation. When the additional scope matches the requested operation, verification on the additional scope in the claims succeeds. When the additional scope does not match the requested operation, the verification fails. (5) Expiration time in the claims is compared with current system time to determine whether the access token expires. When the access token does not expire, verification on the expiration time in the claims succeeds. When the access token expires, the verification fails. In other words, the NF service producer network element verifies all parameters included in the claims in the access token. It should be noted that, when all the parameters in the claims are successfully authenticated, it may indicate that the claims are successfully authenticated. When any parameter in the claims fails to be authenticated, it may indicate that the claims fail to be authenticated.

Step 406*a*: The NF service producer network element sends an NF service response to the NF service consumer network element. Correspondingly, the NF service consumer network element receives the NF service response from the NF service producer network element.

When the verification in step 405*a* succeeds, the NF service producer network element executes the service requested by the NF service consumer network element, and sends an NF service response to the NF service consumer network element. When the verification in step 405*a* fails, the NF service producer network element sends an error response to the NF service consumer network element. The error response may carry a cause value, and the cause value may indicate that the service authorization check fails, for example, integrity checking on the access token fails or verification on the claims fails.

Figure 4B:
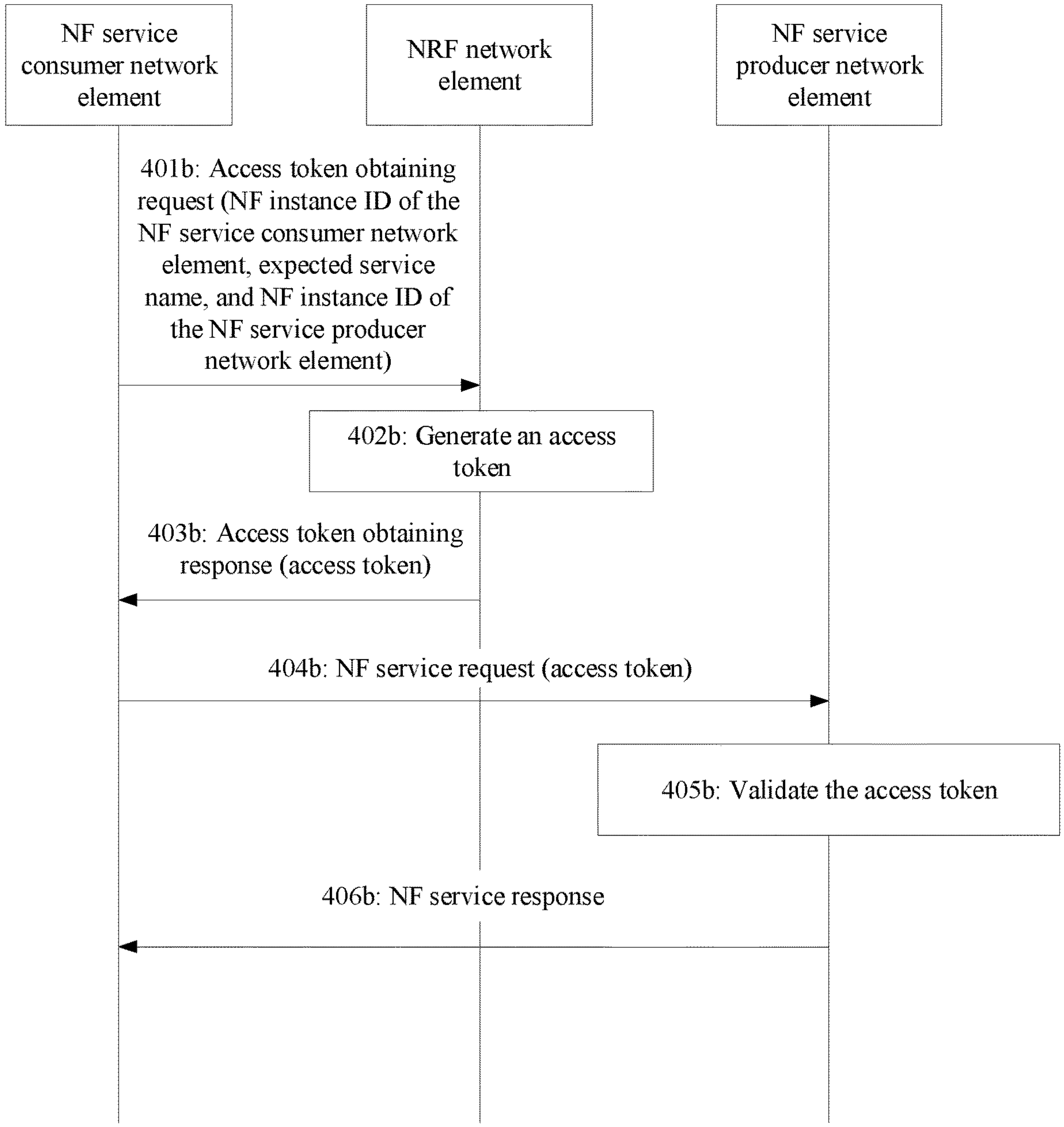
FIG. 4*b* is a schematic diagram of a service authorization procedure based on an access token of type 2 or type 3.

(5.2) Service Authorization Procedure Based on an Access Token of Type 2 or Type 3:

For example, for the service authorization procedure based on the access token of type 2 (or type 3), refer to FIG. 4*b*. For a process that is the same as or similar to that in FIG. 4*a*, refer to the descriptions in FIG. 4*a*. The procedure shown in FIG. 4*b* may include the following steps:

Step 401*b*: An NF service consumer network element sends an access token obtaining request to an NRF network element. Correspondingly, the NRF network element receives the access token obtaining request from the NF service consumer network element.

In the procedure shown in FIG. 4*b*, an access token is used to access a service of a specific instance of the NF service producer network element or used to access a service of a specific service instance of an NF service producer network element. For example, the access token is used to access a session service of a specific SMF network element instance or used to access a session service of a specific service instance of an SMF network element.

The access token obtaining request may include an NF instance ID of an NF service producer network element, an NF instance ID of the NF service consumer network element, and an expected service name. Optionally, the access token obtaining request may further include an additional scope. Optionally, claims may further include an S-NSSAI list or an NSI ID list of an expected instance of the NF service producer network element, and an NF set ID of the expected instance of the NF service producer network element.

Step 402*b*: The NRF network element performs an authorization check on the NF service consumer network element, and generates an access token when the authorization check succeeds.

The NRF network element performs the authorization check on the NF service consumer network element in response to the access token obtaining request. For a process in which the NRF network element performs the authorization check on the NF service consumer network element, refer to the descriptions in step 402*a*. Details are not described herein again.

When the authorization check on the NF service consumer network element succeeds, the claims in the access token generated by the NRF network element may include an NF instance ID of the NRF network element, the NF instance ID of the NF service consumer network element, the NF instance ID of the NF service producer network element, the expected service name, or expiration time. Optionally, the claims may further include an additional scope. Optionally, claims may further include the S-NSSAI list or NSI ID list of the expected instance of the NF service producer network element, and the NF set ID of the expected instance of the NF service producer network element.

The NRF network element may perform integrity protection on the generated access token. For details, refer to the descriptions in step 402*a*.

Step 403*b*: The NRF network element sends an access token obtaining response to the NF service consumer network element. Correspondingly, the NF service consumer network element receives the access token obtaining response from the NRF network element. The access token obtaining response includes an access token, and the access token is signed, or the access token obtaining response includes a MAC value of the access token.

Step 404*b*: The NF service consumer network element sends an NF service request to the NF service producer network element. Correspondingly, the NF service producer network element receives the NF service request from the NF service consumer network element. The NF service request includes the access token.

Step 405*b*: The NF service producer network element verifies the access token.

Specifically, an integrity of the access token may be first checked. When the integrity checking succeeds, the NF service producer network element further verifies the claims in the access token. For a specific method for verifying the claims, refer to step 405*a*.

In step 405*b*, a process in which the NF service producer network element verifies the claims is similar to the process of verifying the access token of type 1 in step 405*a*. A difference lies in that the access token of type 1 includes an NF type of the NF service producer network element. Therefore, the verification process of the access token includes verifying the NF type of the NF service producer network element in the access token. The access token of type 2 or type 3 includes the NF instance ID of the NF service producer network element. Therefore, the verification process of the access token includes verifying the NF instance ID of the NF service producer network element in the access token. When an ID of the NF service producer network element is the same as the NF instance ID of the NF service producer network element in the access token, verification on the NF instance ID of the NF service producer network element in the claims succeeds; if the ID of the NF service producer network element is different from the NF instance ID of the NF service producer network element in the access token, the verification fails.

Step 406*b*: The NF service producer network element sends an NF service response to the NF service consumer network element. Correspondingly, the NF service consumer network element receives the NF service response from the NF service producer network element. When the verification in step 405*b* succeeds, the NF service producer network element executes a requested service, and sends an NF service response to the NF service consumer network element.

Figure 5A:
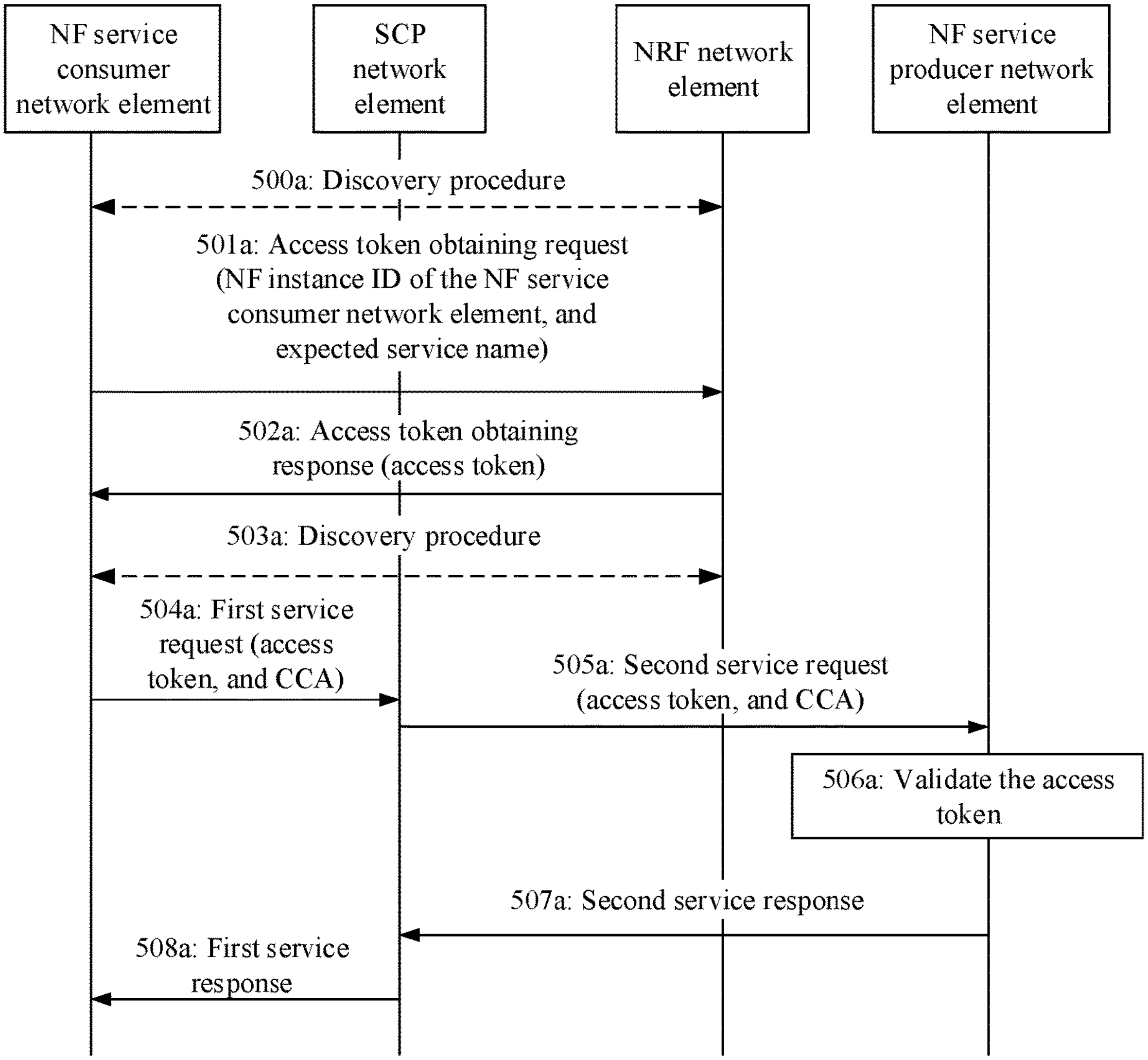
FIG. 5*a* is a schematic diagram of a service authorization procedure in an indirect communication scenario.
Figure 5B:
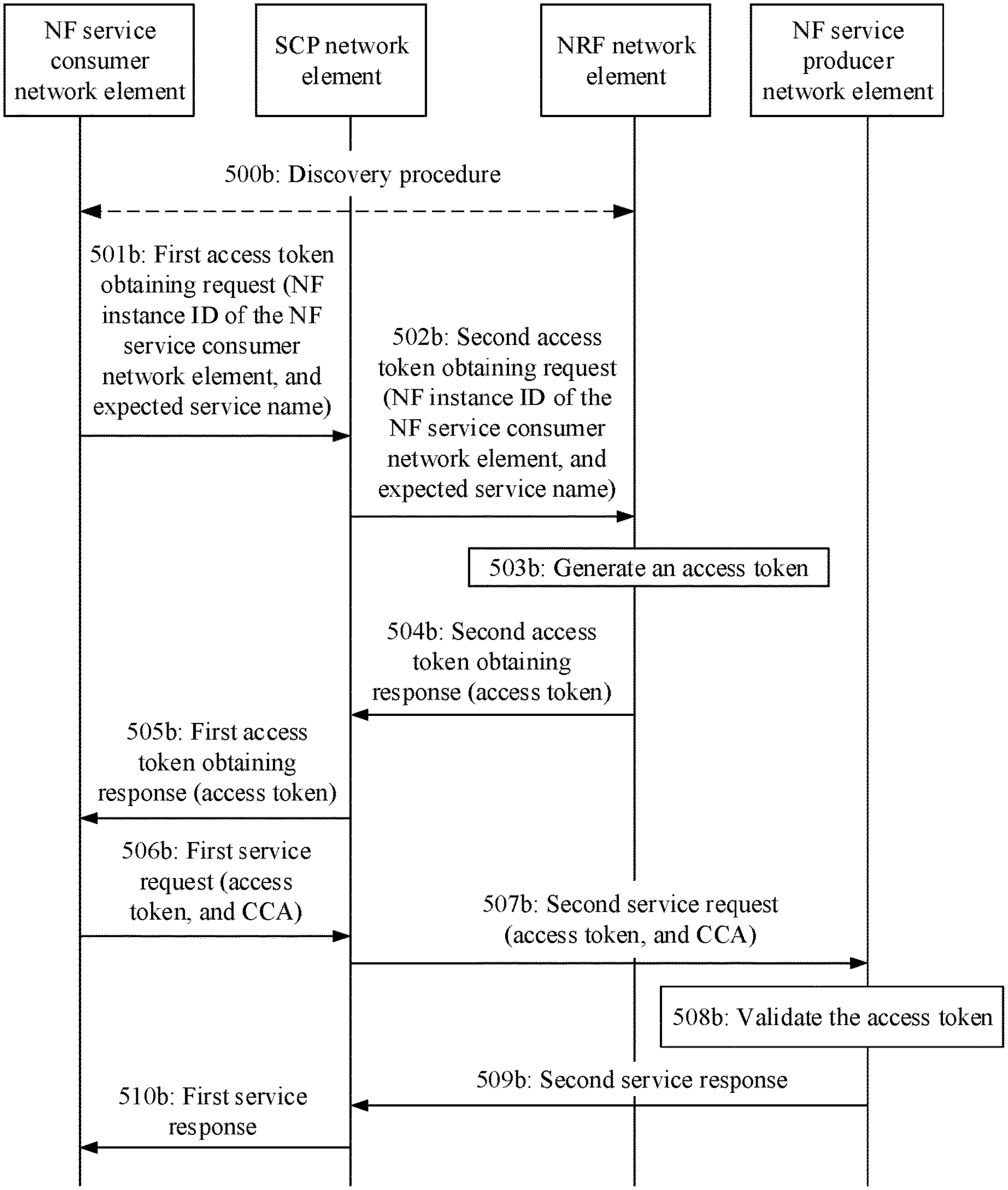
FIG. 5*b* is a schematic diagram of another service authorization procedure in an indirect communication scenario.

The service authorization shown in FIG. 4*a* and FIG. 4*b* may be understood as service authorization in a direct communication scenario. The following describes service authorization in an indirect communication scenario, mainly including service authorization in mode C (referring to FIG. 5*a* and FIG. 5*b*) and service authorization in mode D (referring to FIG. 5*c*). A difference between service authorization procedures shown in FIG. 5*a* and FIG. 5*b* lies in that an NF service consumer network element obtains an access token in different manners. In FIG. 5*a*, the NF service consumer network element directly requests an access token from an NRF network element. In FIG. 5*b*, the NF service consumer network element requests an access token from the NRF network element via an SCP network element.

(6) Service Authorization in an Indirect Communication Scenario

Information about one or more SCP network elements serving an NF network element is configured on the NF network element. When the NF network element is in an indirect communication scenario, the NF network element sends a message to the SCP network element serving the NF network element. In the indirect communication scenario, there may be one or more SCP network elements between an NF service consumer network element and an NF service producer network element. Authorization between the SCP network element and the NF network element, and authorization between the SCP network element and another SCP network element are performed based on a local policy. In other words, authorization is performed in a static authorization manner. Authorization is performed between the NF service consumer network element and the NF service producer network element based on an access token.

(6.1) Service Authorization in Mode C

As shown in FIG. 5*a*, in mode C, an NF service consumer network element may directly request an access token from an NRF network element. The procedure may include the following steps:

Step 501*a*: The NF service consumer network element sends an access token obtaining request to the NRF network element. Correspondingly, the NRF network element receives the access token obtaining request from the NF service consumer network element.

For a parameter included in the access token obtaining request, refer to step 401*a* or step 401*b*. Details are not described herein again.

Step 502a: The NRF network element sends an access token obtaining response to the NF service consumer network element. Correspondingly, the NF service consumer network element receives the access token obtaining response from the NRF network element. The access token obtaining response includes an access token.

Step 501a and step 502a may be understood as a process in which the NF service consumer network element obtains the access token from the NRF network element. For details, refer to the descriptions of step 401a to step 403a in FIG. 4a or step 401b to step 403b.

Step 504a: The NF service consumer network element sends a first service request to an SCP network element. Correspondingly, the SCP network element receives the first service request from the NF service consumer network element. The first service request includes the access token obtained from the NRF network element.

After obtaining the access token, the NF service consumer network element may initiate a service request to an NF service producer network element. In an indirect communication scenario, a manner in which the NF service consumer network element initiates the service request to the NF service producer network element may be as follows: The NF service consumer network element sends the first service request to the SCP network element, to trigger the SCP network element to send a second service request to the NF service producer network element.

Optionally, the first service request further includes a client credentials assertion (CCA). The CCA includes an NF instance ID of the NF service consumer network element, an NF type of the NF service consumer network element, a timestamp, and an expiration time. The NF service consumer network element uses a private key to sign the generated CCA. The timestamp may be, for example, an effective time of the CCA, and the expiration time may be, for example, a time when the CCA is invalid. The signed CCA includes a public key certificate or a certificate chain. Alternatively, the signed CCA includes a uniform resource locator (URL) that locates the public key certificate or the certificate chain. The CCA is used by the NF service producer network element to authenticate an identity of the NF service consumer network element.

It should be noted that in this application, the service request sent by the NF service consumer network element to the NF service producer network element via the SCP network element may be transmitted to the NF service producer network element in a non-transparent transmission mode. For example, the SCP network element may perform an application programming interface (API) modification on the received first service request, and then route a modified second service request to the NF service producer network element. All or some of parameters included in the first service request and the second service request are the same in the non-transparent transmission mode.

In some embodiments, the NRF network element needs to be first queried for information about an available NF service producer network element. In other words, the available NF service producer network element is discovered, and then a service request is initiated to the available NF service producer network element. Therefore, a discovery procedure for discovering the NF service producer network element needs to be performed before the service request is initiated to the NF service producer network element. In other words, the discovery procedure for discovering the NF service producer network element needs to be performed before step 504a.

Optionally, the discovery procedure may be performed before step 501a. Refer to step 500a in FIG. 5a. Alternatively, the discovery procedure may be performed after step 501a and before step 504a. For example, refer to step 503a in FIG. 5a.

Step 505a: The SCP network element sends the second service request to the NF service producer network element. Correspondingly, the NF service producer network element receives the second service request from the SCP network element. The second service request includes the access token.

When receiving the first service request from the NF service consumer network element, the SCP network element selects an instance of the NF service producer network element, performs the API modification, and sends the second service request to the selected NF service producer network element. If the CCA is carried in step 504a, the second service request further includes the CCA.

Step 506a: The NF service producer network element verifies the access token.

Specifically, integrity of the access token may be first checked. When the integrity checking succeeds, the NF service producer network element further verifies the claims in the access token. For an example method for verifying the claims, refer to step 405a. Details are not described herein again.

When the second service request includes the CCA, after successfully verifying the access token, the NF service producer network element may further verify the CCA to authenticate the NF service consumer network element. For example, the NF service producer network element uses a public key of the NF service consumer network element to perform a signature verification on the CCA. When the signature verification succeeds, the NF service producer network element further verifies whether information included in the CCA matches information about the claims in the access token. When the two types of information match each other, it may indicate that the NF service consumer network element is successfully authenticated. When the two types of information do not match each other, the NF service consumer network element fails to be authenticated. Further, manners in which the NF service producer network element verifies whether the information included in CCA matches the information about the claims in the access token may include but are not limited to: (1) verifying whether the NF instance ID of the NF service consumer network element in the CCA is the same as an NF instance ID of the NF service consumer network element in the access token; (2) verifying whether the NF type of the NF service consumer network element in the CCA is the same as an NF type of the NF service consumer network element in the access token; and (3) comparing the expiration time in the CCA with current system time to determine whether the CCA expires. When the NF instance ID of the NF service consumer network element in the CCA is the same as the NF instance ID of the NF service consumer network element in the access token, the NF type of the NF service consumer network element in the CCA is the same as the NF type of the NF service consumer network element in the access token, and the CCA does not expire, it may indicate that the NF service consumer network element is successfully authenticated.

When the second service request includes the CCA, the NF service producer network element may alternatively authenticate the NF service consumer network element based on the CCA, and then verify the access token. A specific verification sequence is not limited herein.

Step 507*a*: The NF service producer network element sends a second service response to the SCP network element. Correspondingly, the SCP network element receives the second service response from the NF service producer network element.

When the authorization check on the NF service consumer network element succeeds, that is, the verification in step 506*a* succeeds, the NF service producer network element executes a service requested by the NF service consumer network element, and sends the second service response to the SCP network element. When the verification in step 506*a* fails, the NF service producer network element may send an error response to the NF service consumer network element via the SCP network element.

Step 508*a*: The SCP network element sends a first service response to the NF service consumer network element. Correspondingly, the NF service consumer network element receives the first service response from the SCP network element.

When receiving the second service response from the NF service producer network element, the SCP network element performs the API modification, and sends the first service response to the NF service consumer network element.

It should be noted that, in this application, the service response sent by the NF service producer network element to the NF service consumer network element via the SCP network element may be transmitted to the NF service consumer network element in a non-transparent transmission mode. For example, the SCP network element may perform the API modification on the received second service response, and then route the first service response to the NF service consumer network element. All or some of parameters included in the first service response and the second service response are the same in the non-transparent transmission mode.

In mode C, an NF service consumer network element may request an access token from an NRF network element via an SCP network element. For this procedure, refer to FIG. 5*b*. This procedure is similar to the procedure shown in FIG. 5*a* except that a manner in which the NF service consumer network element obtains an access token is different. For details of same steps, refer to the descriptions of FIG. 5*a*. The procedure shown in FIG. 5*b* may include the following steps:

Step 501*b*: The NF service consumer network element sends a first access token obtaining request to the SCP network element. Correspondingly, the SCP network element receives the first access token obtaining request from the NF service consumer network element.

In an indirect communication scenario, a manner in which the NF service consumer network element requests an access token from the NRF network element via the SCP network element may include that the NF service consumer network element sends the first access token obtaining request to the SCP network element, to trigger the SCP network element to send a second access token obtaining request to the NRF network element.

For a parameter carried in the first access token obtaining request, refer to the parameter carried in the access token obtaining request in step 401*a* or step 401*b*. Optionally, the first access token obtaining request further includes a CCA, which is used by the NRF network element to authenticate an identity of the NF service consumer network element.

Step 502*b*: The SCP network element sends the second access token obtaining request to the NRF network element. Correspondingly, the NRF network element receives the second access token obtaining request from the SCP network element.

A parameter included in the second access token obtaining request is the same as that included in the first access token obtaining request.

It should be noted that, in this application, the access token obtaining request (for example, the first access token obtaining request in step 501*b*) sent by the NF service consumer network element to the NRF network element via the SCP network element may be transmitted to the NRF network element in a non-transparent transmission mode, and an access token obtaining response (for example, a second access token obtaining response in step 504*b*) sent by the NRF network element to the NF service consumer network element via the SCP network element may be transmitted to the NF service consumer network element in a non-transparent transmission mode. In other words, the SCP network element may perform the API modification on the received access token obtaining request and access token obtaining response, then route a modified access token obtaining request to the NRF network element, and route a modified access token obtaining response to the NF service consumer network element.

Step 503*b*: The NRF network element generates an access token. Optionally, before generating the access token, the NRF network element may first perform an authorization check on the NF service consumer network element. When the authorization check succeeds, the NRF network element generates the access token. When the authorization check fails, the NRF network element refuses to generate the access token for the NF service consumer network element.

Optionally, when the second access token obtaining request carries the CCA, the NRF network element authenticates the NF service consumer network element based on the CCA, and if the authentication succeeds, it is further verified whether the NF service consumer network element has permission to access a requested service. For an example implementation process of authenticating the NF service consumer network element based on the CCA, refer to specific descriptions in step 506*a*. For an example implementation process of verifying whether the NF service consumer network element has permission to access the requested service, refer to the descriptions in step 402*a*. Details are not described herein again.

The NRF network element may perform an integrity protection on the generated access token. For details, refer to the descriptions in step 402*a*.

Step 504*b*: The NRF network element sends the second access token obtaining response to the SCP network element. Correspondingly, the SCP network element receives the second access token obtaining response from the NRF network element. The second access token obtaining response includes the access token. The access token is signed, or the second access token obtaining response includes a MAC value of the access token.

Step 505*b*: The SCP network element sends a first access token obtaining response to the NF service consumer network element. Correspondingly, the NF service consumer network element receives the first access token obtaining response from the SCP network element. The first access token obtaining response includes the access token.

Step 506*b*: The NF service consumer network element sends a first service request to the SCP network element. Correspondingly, the SCP network element receives the first service request from the NF service consumer network element. The first service request includes the access token.

Refer to the descriptions in step 504*a*. The NRF network element needs to be first queried to discover an available NF service producer network element, and then the service request can be initiated to the NF service producer network element. Therefore, a discovery procedure needs to be performed before the service request is initiated to the NF service producer network element. Optionally, the discovery procedure may be performed before step 501*b*. Refer to step 500*b* in FIG. 5*b* (the NF service consumer network element performs a discovery procedure of an NF service producer network element by querying the NRF network element, to discover an available NF service producer network element). Alternatively, the discovery procedure may be performed after step 501*b* and before step 506*b*. This is not shown in FIG. 5*b*.

It should be noted that, for an example implementation process of step 506*b* to step 510*b*, refer to the descriptions of step 504*a* to step 508*a*. Details are not described herein again.

Step 507*b*: The SCP network element sends a second service request to the NF service producer network element. Correspondingly, the NF service producer network element receives the second service request from the SCP network element. The second service request includes the access token.

Step 508*b*: The NF service producer network element verifies the access token. For an example implementation process of step 508*b*, refer to the descriptions of step 405*a*. Details are not described herein again.

Step 509*b*: The NF service producer network element sends a second service response to the SCP network element. Correspondingly, the SCP network element receives the second service response from the NF service producer network element.

Step 510*b*: The SCP network element sends a first service response to the NF service consumer network element. Correspondingly, the NF service consumer network element receives the first service response from the SCP network element.

(6.2) Service Authorization in Mode D.

Figure 5C:
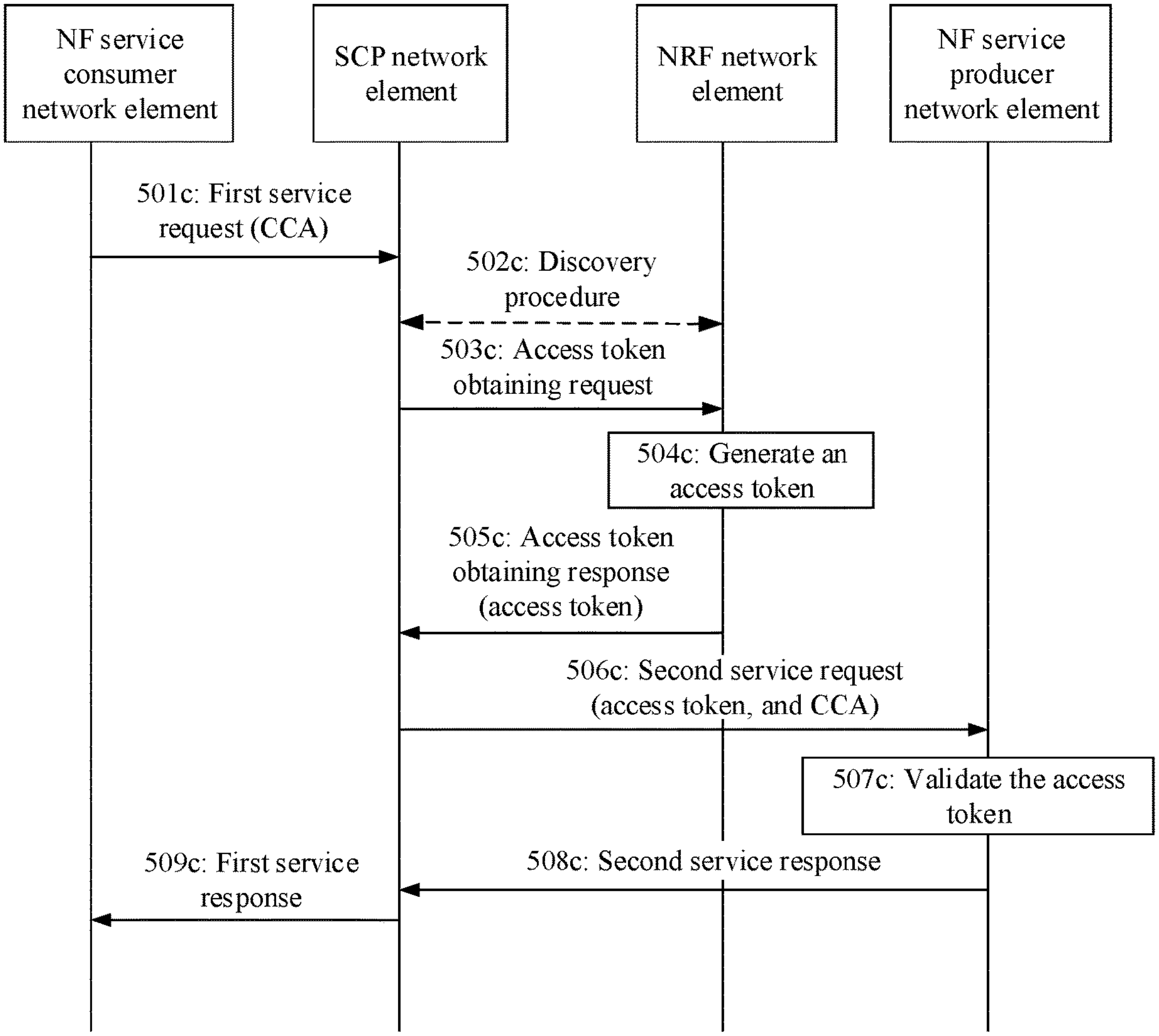
FIG. 5*c* is a schematic diagram of still another service authorization procedure in an indirect communication scenario.

As shown in FIG. 5*c*, in mode D, an SCP network element requests, based on a service request sent by an NF service consumer network element, an access token from an NRF network element. This procedure is similar to the procedures shown in FIG. 5*a* and FIG. 5*b* except that a manner of obtaining an access token is different. For details of same steps, refer to the descriptions of FIG. 5*a* and FIG. 5*b*. The procedure shown in FIG. 5*c* may include the following steps:

Step 501*c*: The NF service consumer network element sends a first service request to the SCP network element. Correspondingly, the SCP network element receives the first service request from the NF service consumer network element.

The first service request may include a CCA used by an NF service producer network element to authenticate an identity of the NF service consumer network element. Optionally, the first service request further includes an access token. The access token is received in a service response before the NF service consumer network element interacts with the SCP network element. When the access token obtained before the NF service consumer network element interacts with the SCP network element expires, the SCP network element needs to obtain an access token from the NRF network element. In this case, the first service request may further include a parameter used by the SCP network element to obtain an access token. If the SCP network element needs to query the NRF to discover an available NF service producer network element, the first service request may further carry a discovery parameter used to discover the NF service producer network element. The parameter for obtaining the access token (that is, a parameter in an access token obtaining request) may be the same as or different from the parameter used to discover the NF service producer network element. This is not limited in this embodiment.

Step 503*c*: The SCP network element sends the access token obtaining request to the NRF network element. Correspondingly, the NRF network element receives the access token obtaining request from the SCP network element.

After the SCP network element receives the first service request, when the first service request does not include the access token, or the access token expires, or the SCP network element does not store an available access token, the SCP network element may send the access token obtaining request to the NRF network element, to request an access token. For a parameter carried in the access token obtaining request, refer to the parameter carried in the access token obtaining request in step 401*a* or step 401*b*. Optionally, the access token obtaining request may further include the CCA, which is used by the NRF network element to authenticate the identity of the NF service consumer network element. Optionally, if the first service request may further include a parameter used by the SCP network element to obtain the access token, the access token obtaining request further includes the parameter.

Step 504*c*: The NRF network element generates an access token.

For an example implementation process of step 504*c*, refer to the descriptions of step 503*b*. Details are not described herein again.

Step 505*c*: The NRF network element sends an access token obtaining response to the SCP network element. Correspondingly, the SCP network element receives the access token obtaining response from the NRF network element. The access token obtaining response includes the access token, and the access token is signed, or the second access token obtaining response includes a MAC value of the access token.

Step 506*c*: The SCP network element sends a second service request to the NF service producer network element. Correspondingly, the NF service producer network element receives the second service request from the SCP network element. The second service request includes the access token.

After receiving the access token obtaining response, the SCP network element sends the second service request to the NF service producer network element in response to the first service request. Optionally, when the first service request includes a CCA, the second service request further includes the CCA.

Refer to the descriptions in step 504*a*. A discovery procedure for discovering an NF service producer network element needs to be performed before the service request is initiated to the NF service producer network element. In mode D, the discovery procedure is triggered by the SCP network element. Therefore, the discovery procedure may be performed before the SCP network element sends the second service request to the NF service producer network element (step 506*c*). Optionally, the discovery procedure may be performed before step 503*c*. Refer to step 502*c* in FIG. 5*c* (the SCP network element and the NRF network element perform the discovery procedure to discover an available NF service producer network element). Alternatively, the discovery procedure may be performed after step 501*c* and before step 506*c*. This is not shown in FIG. 5*c*. If the first service request further carries the foregoing discovery parameter, the SCP network element may send the discovery parameter to the NRF network element to discover an NF service producer network element.

It should be noted that when the access token is not requested for a specific NF service producer network element in step 503*c*, for example, the access token is requested for a specific NF type (that is, an access token of type 1) in step 503*c*, the access token obtaining request does not include an NF instance ID of the specific NF service producer network element. Therefore, the foregoing discovery procedure may be performed at any time between step 503*c* and step 506*c*. When the access token is requested for a specific NF service producer network element in step 503*c*, that is, an access token of type 2 or type 3, the access token obtaining request includes an NF instance ID of the specific NF service producer network element. Therefore, the foregoing discovery procedure needs to be performed before the SCP network element sends the access token obtaining request to the NRF network element (step 503*c*). When the SCP network element stores an available access token, or an access token that has not expired is carried in step 501*c*, step 503*c* to step 505*c* may not be performed, and step 506*c* is directly performed after step 502*c*.

Step 507*c*: The NF service producer network element verifies the access token. For an example implementation process of step 507*c*, refer to the descriptions of step 506*a*. Details are not described herein again.

Step 508*c*: The NF service producer network element sends a second service response to the SCP network element. Correspondingly, the SCP network element receives the second service response from the NF service producer network element.

When an authorization check on the NF service consumer network element succeeds, that is, the verification in step 507*c* succeeds, the NF service producer network element executes a service requested by the NF service consumer network element, and sends the second service response to the SCP network element.

Step 509*c*: The SCP network element sends a first service response to the NF service consumer network element. Correspondingly, the NF service consumer network element receives the first service response from the SCP network element.

In the procedures shown in FIG. 5*a* to FIG. 5*c*, one SCP network element is used as an example. There may be a plurality of SCP network elements involved in actual application.

(7) Service, Service Domain, and Service Domain Information

An NF network element may be configured to provide a service, and one NF network element may provide one or more services. For example, an SMF network element may be configured to provide a session establishment service, a session release service, and the like. An SCP network element may also be configured to provide a routing and forwarding service for another network element (for example, an NF network element or another SCP network element).

A service domain is used to limit a service access scope. For example, a network element has permission to access a service of another network element belonging to a same service domain as the network element. Alternatively, a network element has permission to access a service of a network element belonging to a service domain 1 or a service domain 3, but does not have permission to access a service of a network element belonging to another service domain other than the service domain 1 and the service domain 3.

The service domain may be defined from different dimensions, for example, the service domain may refer to a security domain from a security dimension. The service domain may refer to an SCP domain or a home area from a dimension of a geographical location or communication group. The service domain may refer to an SCP security domain from a dimension of security and address location or from a dimension of security and communication group.

Different security domains may have different security levels. Access control policies between security domains with different security levels help ensure security of access. For example, the access control policy is that a network element belonging to a security domain with a low security level cannot access a network element belonging to a security domain with a high security level. For example, if a security level of a security domain 1 is lower than a security level of a security domain 2, a network element belonging to the security domain 1 cannot access a network element belonging to the security domain 2.

An identifier of an SCP domain (an identifier of a home area) may be used to indicate a geographical location of a network element belonging to the domain. For example, the geographical location indicated by the identifier of the SCP domain is North China, South China, or the like. Different identifiers of SCP domains indicate different geographical locations. In some embodiments, an access control policy between different SCP domains may be configured. For example, the access control policy includes that a network element belonging to an SCP domain 1 (an indicated geographical location is North China) can access a network element belonging to an SCP domain 2 (an indicated geographical location is South China). It is assumed that an AMF network element 1 belongs to the SCP domain 1, and the AMF network element 1 expects to access an SMF network element to obtain a session establishment service. If the AMF network element 1 sends a service request to an SMF network element 1, and the SMF network element 1 belongs to an SCP domain 3, the SMF network element 1 cannot provide the session establishment service for the AMF network element 1. When the SMF network element 1 belongs to the SCP domain 2, the SMF network element 1 may provide the session establishment service for the AMF network element 1.

The identifier of SCP domain may also be used to indicate a group in which communication or interaction can be performed via one or more SCPs.

An identifier of SCP security domain may be used to indicate a geographical location and a security level of a network element belonging to the domain, or used to indicate a communication group to which a network element belonging to the domain belongs and a security level of the network element. It should be noted that the access control policy may be configured. The foregoing is merely an example, and does not constitute a limitation.

In this application, service domain information may be configured for a network element (for example, an NF network element or an SCP network element) other than the NRF network element. Service domain information configured for a network element includes: information about a service domain to which the network element belongs, and/or information about a service domain that can be served by the network element (that is, the network element can provide a service for another network element belonging to the service domain). For example, service domain information configured for the SMF network element includes information about the service domain 1, which may indicate that the SMF network element belongs to the service domain 1, or the SMF network element may provide a service for a network element belonging to the service domain 1. If an AMF network element belongs to the service domain 1, the SMF network element may provide a service for the AMF network element. It should be noted that "a network element serves (can serve) a service domain" mentioned in this application means that the network element can provide a service for another network element belonging to the service domain. Service domain information configured for a network element may be locally stored in the network element.

An access token (for example, the foregoing access token, an access token*, an SCP access token*, and an SCP access token mentioned below) mentioned in embodiments of this application may include service domain information. The service domain information included in the access token is related to a network element corresponding to the access token, or is related to a network element for which the access token is generated. For example, if an access token 1 is generated by the NRF network element for a network element 1, a network element corresponding to the access token 1 is the network element 1, and service domain information in the access token 1 is related to the network element 1. Specifically, the service domain information in the access token 1 may include information about a service domain to which the network element 1 belongs and/or information about a service domain to which a network element that the network element 1 is allowed to access belongs. For example, service domain information in an access token generated for an AMF network element may include information about a service domain to which the AMF network element belongs and/or information about a service domain to which an SMF network element that the AMF network element is allowed to access belongs. For another example, if the service domain information in the access token generated for the AMF network element indicates the service domain 1, it may indicate that the service domain to which the AMF network element belongs is the service domain 1, and/or the AMF network element has permission to access a service provided by a network element (for example, an SMF network element) belonging to the service domain 1. It should be noted that the foregoing sentence of "the access token 1 is generated by the NRF network element for the network element 1" means that the access token 1 is generated by the NRF network element for a service requested by the network element 1. This may be understood as the access token is generated for a service requested by a network element.

In some embodiments, one NF network element may belong to one or more service domains. For example, the SMF network element may belong to the service domain 1 and a service domain 2. One NF network element may serve network elements in different service domains. For example, the SMF network element may serve the AMF network element 1 belonging to the service domain 1, and may serve an AMF network element 2 belonging to the service domain 2. Optionally, the service domain information in the access token may be used to indicate the one or more service domains. For example, if the service domain information in the access token generated for the AMF network element indicates the service domain 1 and the service domain 2, it may indicate that the AMF network element belongs to the service domain 1 and the service domain 2, and/or the AMF network element has permission to access a service provided by a network element (for example, the SMF network element) belonging to the service domain 1 and/or the service domain 2. Optionally, the access token mentioned in some embodiments may further include one or more parameters in the foregoing claims. Optionally, the service domain information may be included in the claims in the access token. It should be noted that the NRF network element may generate an access token for an NF network element, for example, generate an access token for an NF network element that needs to initiate a service request. The NRF network element may further generate an access token for the SCP network element. It should be further noted that, in some embodiments, that a network element (for example, the network element 1) is allowed to access another network element (for example, a network element 2) may be further described as follows: The network element 1 has permission to access a service provided by the network element 2, the network element 1 has permission to access the network element 2, the network element 1 has permission to visit a service provided by the network element 2, or the network element 1 is authorized to access the network element 2. If the network element 1 is the SCP network element, it may also be described as follows: The network element 1 has permission of a communication proxy, that is, the network element 1 has permission of a communication proxy for the network element 2.

The service domain information may include security domain information, SCP domain information, SCP security domain information, or other information used to limit a service access scope. For example, the service domain information may be SCP domain information, and is used to identify an SCP domain. Alternatively, the service domain information may be security domain information, and is used to identify a specific security domain, a security level, a security grade, or the like.

(8) Types of Access Tokens:

Access tokens used in a direct communication scenario may include an access token and an access token*. The access token may be used to indicate that an NF service consumer network element has permission to access a specified service provided by an NF service producer network element. Optionally, the access token may further include service domain information, used to indicate that the NF service consumer network element has permission to access a specified service provided by the NF service producer network element belonging to a specified service domain. The access token including the service domain information may be referred to as the access token*. In this case, the service domain information may be security domain information, security domain information of a specific area, security domain information of a specific group, or the like.

Access tokens used in an indirect communication scenario may include an access token*, an SCP access token*, and an SCP access token.

The access token* (or referred to as a first access token) may be used to indicate that the NF service consumer network element has permission to access the specified service provided by the NF service producer network element belonging to the specified service domain. The first access token may include first service domain information associated with the specified service domain, an identifier of the NF service consumer network element, and an identifier of the specified service. The identifier of the NF service consumer network element is used to identify the NF service consumer network element, and the identifier of the NF service consumer network element may be, for example, an NF instance ID of the NF service consumer network element. The identifier of the specified service is used to identify a service requested by the NF service consumer network element. The identifier of the specified service may also be described as an expected service name. For example, the NF instance ID of the NF service consumer network element is an AMF instance ID 1, and the identifier of the specified service is an identifier of a session establishment service. Optionally, the first access token may further include one or more parameters in the foregoing claims. Content of the access token* is integrity protected.

The first service domain information may be service domain information of the NF service consumer network element or service domain information of the NF service producer network element. That the first service domain information is the service domain information of the NF service consumer network element means that a service domain indicated by the first service domain information is a service domain to which the NF service consumer network element initiating a service request belongs. That the first service domain information is the service domain information of the NF service producer network element means that the service domain indicated by the first service domain information is information about a service domain to which an NF service producer network element that the NF service consumer network element is allowed to access belongs. For example, the NF service consumer network element is an AMF network element #1, the NF service producer network element is an SMF network element #1, and a service domain indicated by the first service domain information in the first access token generated for the AMF network element #1 is a service domain a. If the first service domain information is service domain information of the AMF network element, it indicates that a service domain to which the AMF network element #1 belongs is the service domain a. When the first service domain information is service domain information of the SMF network element, it indicates that a service domain to which an SMF network element that the AMF network element #1 is allowed to access belongs, or that the AMF network element #1 has permission to access a service provided by the SMF network element belonging to the service domain a.

The SCP access token* (or referred to as a second access token) may be used to indicate that the NF service consumer network element has permission to access an SCP network element, or may be described as the NF service consumer network element being authorized to access an SCP network element. For example, when a message sent by the NF service consumer network element to an SCP network element 1 includes the second access token, and an authorization verification performed by the SCP network element 1 on the second access token succeeds, it indicates that the NF service consumer network element has permission to access the SCP network element 1. The second access token may include the identifier of the NF service consumer network element and an identifier (for example, an NF instance ID) of a token generation network element. Service domain information in the second access token may include information about the service domain to which the NF service consumer network element belongs or information about a service domain to which an SCP network element that the NF service consumer network element is allowed to access belongs. Optionally, the second access token may further include one or more parameters in the claims. Content of the SCP access token* is integrity protected.

The SCP access token (including a third access token and a fourth access token) may be used to indicate that an SCP network element has permission of a communication proxy. Specifically, the third access token may be used to indicate to an SCP network element that another SCP network element has permission to forward a message via the SCP network element. For example, if a message sent by the SCP network element 1 to an SCP network element 2 includes the third access token, and authorization verification performed by the SCP network element 2 on the third access token succeeds, it indicates that the SCP network element 1 has permission of the communication proxy. In other words, the SCP network element 1 has permission of forwarding the message via the SCP network element 2. In this case, service domain information included in the third access token is information about a service domain to which the SCP network element 1 belongs or information about a service domain to which an SCP network element that the SCP network element 1 is allowed to access belongs. Optionally, the third access token further includes an instance identifier of the SCP network element 1. Specifically, the fourth access token may be used to indicate to the NF service producer network element that an SCP network element has permission of a communication proxy. When a message sent by the SCP network element 2 to the NF service producer network element includes the fourth access token, and authorization verification performed by the NF service producer network element on the fourth access token succeeds, it indicates that the SCP network element 2 has permission to forward the message to the NF service producer network element. In this case, service domain information included in the fourth access token is information about a service domain to which the SCP network element 2 belongs or information about a service domain to which an NF service producer network element that the SCP network element 2 is allowed to access belongs. Optionally, the fourth access token further includes an instance identifier of the SCP network element 2.

Refer to the foregoing descriptions. The SCP domain is introduced in indirect communication, and network elements belonging to a same SCP domain may directly interact with each other. However, in the procedures shown in FIG. 4*a*, FIG. 4*b*, and FIG. 5*a* to FIG. 5*c*, access control and resource isolation between SCP domains are not considered, which leads to security risks in service authorization.

In view of this, embodiments of this application provide for a service authorization method and a communication apparatus, to improve security of a service authorization.

Figure 6:
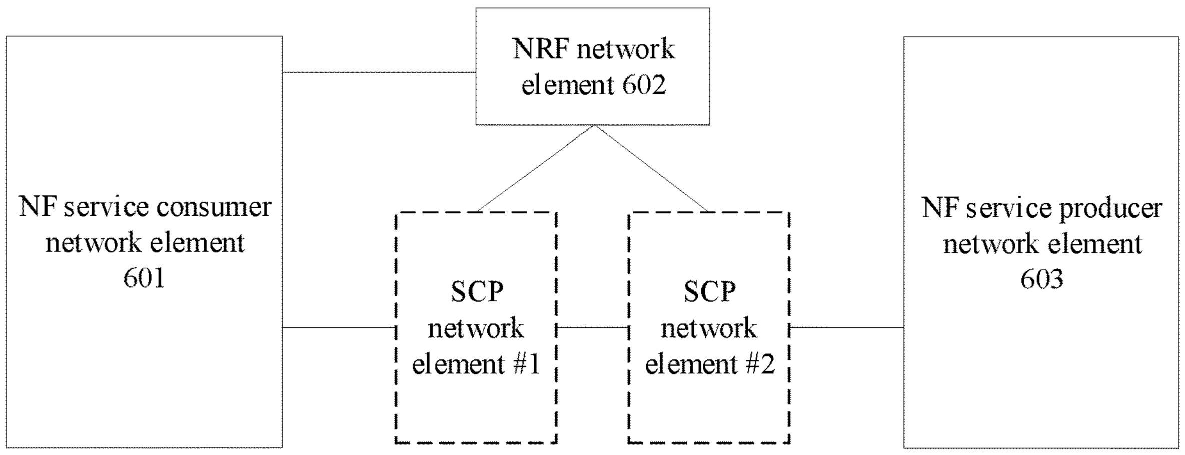
FIG. 6 is a schematic diagram of a system architecture to which an embodiment of this application is applied.

FIG. 6 is a schematic diagram of a system architecture to which an embodiment of this application is applied. The system architecture may include an NF service consumer network element 601, an NRF network element 602, and an NF service producer network element 603. Optionally, the system architecture may further include one or more SCP network elements. The SCP network element in the system architecture may be used in a process of requesting the NRF network element 602 to generate an access token (access token*) for the NF service consumer network element 601, and a process in which the NF service consumer network element 601 requests a service from the NF service producer network element 603 (that is, forwarding a service request for the NF service consumer network element 601), and/or is configured to request the NRF network element 602 to generate an access token (SCP access token) for the SCP. Interaction between the NF service consumer network element 601 and the NF service producer network element 603 may involve one or more SCP network elements. Two SCP network elements are as an example in FIG. 6, which does not constitute a limitation.

The system architecture not including an SCP network element may be understood as a system architecture in a direct communication scenario. The system architecture including an SCP network element may be understood as a system architecture in an indirect communication scenario and is applicable to mode C and mode D.

When the system architecture is applied in this application, a network element that initiates a service request may include an access token in the service request, where the access token may include service domain information. A network element that receives the service request may perform, based on the access token, an authorization check on the network element that initiates the service request, to determine whether the network element that initiates the service request has permission to access a service provided by a network element belonging to a service domain associated with the service domain information. In this way, a service domain-based access control can be implemented, and it is ensured that only an authorized user can obtain a corresponding service or obtain a corresponding service through the SCP. This arrangement implements resource access control. In addition, the access token includes the service domain information, so that the access token can be prevented from being used in an unauthorized service domain. This improves security of service authorization.

The network element that initiates the service request may be the NF service consumer network element 601. The NF service consumer network element 601 requests the NF service producer network element 603 to provide a service for the NF service consumer network element 601. For example, when receiving the service request from the NF service consumer network element 601, the NF service producer network element 603 performs an authorization check on the NF service consumer network element 601 based on the service domain information carried in the service request. When the service domain information in the access token indicates that the NF service consumer network element 601 belongs to a service domain 1, and the NF service producer network element 603 can provide a service only for a network element belonging to a service domain 2, the authorization check performed by the NF service producer network element 603 on the NF service consumer network element 601 fails. In this way, a service resource of the service domain 2 is isolated from a service resource of the service domain 1, so that a network element belonging to the service domain 1 is prevented from obtaining the service resource of the service domain 2, and security is improved. For another example, when receiving the service request from the NF service consumer network element 601, an SCP network element #1 performs an authorization check on the NF service consumer network element 601 based on the service domain information carried in the service request.

The network element that initiates the service request may alternatively be the SCP network element. The SCP network element requests a next-hop network element to provide a service for the SCP network element. In FIG. 6, a next-hop network element of the SCP network element #1 is an SCP network element #2. If the SCP network element #1 sends a message to the SCP network element #2, it may be considered that the SCP network element #1 requests the SCP network element #2 to provide a communication proxy service for the SCP network element #1 (or requests the SCP network element #2 to provide a message forwarding service for the SCP network element #1). In this case, the network element that initiates the service request is the SCP network element #1. For example, when receiving the service request from the SCP network element #1, the SCP network element #2 performs an authorization check on the SCP network element #1 based on the service domain information carried in the service request. Optionally, the message sent by the SCP network element #1 to the SCP network element #2 may further carry information about the service request that the NF service consumer network element 601 requests the NF service producer network element 603 to provide a service for the NF service consumer network element 601. In this case, the SCP network element #2 may perform the authorization check on the SCP network element #1 and/or the NF service consumer network element 601. For another example, when receiving a message from the SCP network element #2, the NF service producer network element 603 performs the authorization check on the SCP network element #2 based on service domain information carried in the message. If the message further carries information about the service request that the NF service consumer network element 601 requests the NF service producer network element 603 to provide a service for the NF service consumer network element 601, the NF service producer network element 603 may perform the authorization check on the SCP network element #2 and/or the NF service consumer network element 601. In other words, the network element that receives the service request may perform the authorization check on a previous-hop network element that the service request passes through, and/or perform the authorization check on the network element that initiates the service request.

If the authorization check succeeds, the network element that receives the service request provides, for the network element that initiates the service request, a service requested by the network element that initiates the service request. Optionally, the network element that receives the service request may further send a service response to the network element that initiates the service request. When the authorization check fails, an error response may be sent to the network element that initiates the service request, and the error response carries a cause value used to indicate that the authorization check fails.

The technology described in embodiments of this application may be applied to various communication systems, for example, a 5G communication system, a system integrating a plurality of communication systems, or a future evolved communication system. It should be noted that the NRF network element 602 is configured to generate an access token, and the NRF network element 602 may have different names in different communication systems.

It can be understood that the communication system described in embodiments of this application is used to describe the technical solution in embodiments of this application more clearly, but does not limit the technical solution provided in embodiments of this application. A person skilled in the art may learn that with evolution of a system architecture and emergence of a new service scenario, the technical solutions provided in embodiments of this application is also applicable to a similar technical problem.

The following describes in detail the service authorization method provided in embodiments of this application. It should be noted that names of messages transmitted between network elements, names of parameters in the messages, or the like in the following embodiments of this application are merely examples, and there may be other names in other implementations. This is not limited in embodiments of this application. It should be further noted that in the accompanying drawings of the embodiments of this application, steps shown in embodiments and a sequence of the steps are used as examples, and do not constitute a limitation on the embodiments of this application. It should be understood that performing some steps in figures or adjusting a sequence of the steps for implementations shall fall within the protection scope of this application.

Figure 7:
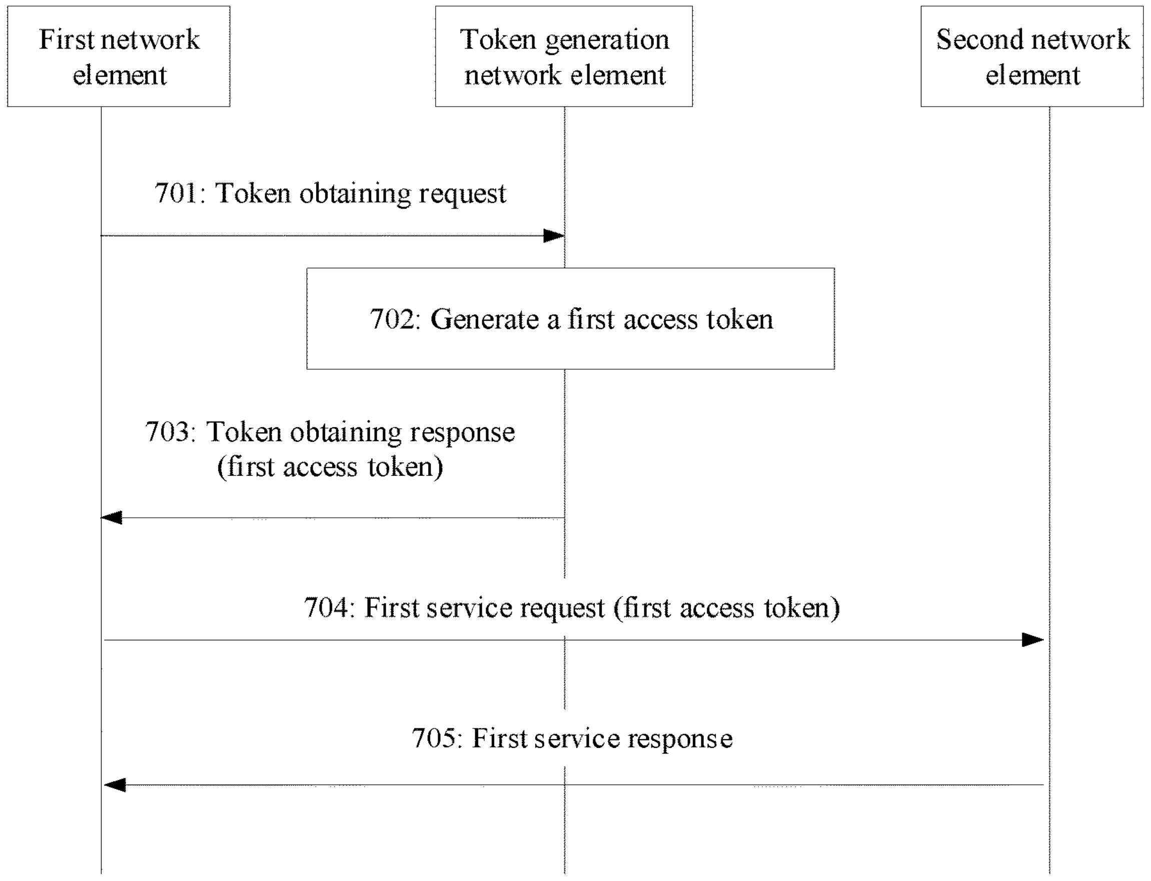
FIG. 7 is a schematic flowchart of a service authorization method according to an embodiment of this application.

FIG. 7 is a schematic flowchart of a service authorization method according to an embodiment of this application. Descriptions are provided below by using an example in which a first network element, a second network element, and a token generation network element perform the service authorization method. The method may include but is not limited to the following steps:

Step 701: The first network element sends a token obtaining request to the token generation network element. Correspondingly, the token generation network element receives the token obtaining request from the first network element. The token obtaining request includes an identifier of an NF service consumer network element and an identifier of a specified service.

The identifier of the NF service consumer network element is used to identify the NF service consumer network element, and is, for example, an NF instance ID of the NF service consumer network element. The identifier of the specified service may also be described as an expected service name, and is used to identify a service requested by the NF service consumer network element. The token obtaining request is used to request to generate an access token for a service that is requested by the NF service consumer network element. Correspondingly, the access token may be used to perform an authorization check on the service requested by the NF service consumer network element. Optionally, the first network element and the token generation network element may belong to a same PLMN.

In an implementation, the token obtaining request may be used to request an access token of type 1, or used to request an access token of type 2 or type 3. Optionally, the token obtaining request may further include one or more parameters in the access token obtaining request as described in FIG. 4*a* or FIG. 4*b*. For example, the token obtaining request may further include one or more of the following parameters: an NF instance ID of an NF service producer network element, an additional scope, an NF type of the NF service consumer network element, an NF type of a requested NF service producer network element, an S-NSSAI list or an NSI ID list of a requested instance of the NF service producer network element, an NF set ID of the requested instance of the NF service producer network element, an S-NSSAI list of the NF service consumer network element, or service domain information.

The service domain information indicates a service domain to which the NF service consumer network element belongs, and/or used to indicate a service domain to which the NF service producer network element belongs.

The service authorization method shown in FIG. 7 may be applied to a direct communication scenario or an indirect communication scenario. When the method is applied to the direct communication scenario, the first network element is an NF service consumer network element, and the second network element is an NF service producer network element. When the method is applied to the direct communication scenario, the first network element directly sends the token obtaining request to the token generation network element.

When the method is applied to the indirect communication scenario, the first network element may be the NF service consumer network element or an SCP network element (which is referred to as a second SCP network element or the like). For example, the first network element is the NF service consumer network element in FIG. 6, and the second network element is the SCP network element #1 or the SCP network element #2 in FIG. 6. Alternatively, the first network element is the SCP network element #1 (namely, the second SCP network element) in FIG. 6, and the second network element may be the SCP network element #2 or the NF service producer network element in FIG. 6. It can be learned that when the method is applied to the indirect communication scenario, the first network element may be a service initiator (namely, the NF service consumer network element), or may be the second SCP network element that provides a routing and forwarding service for a service request.

Figure 8:
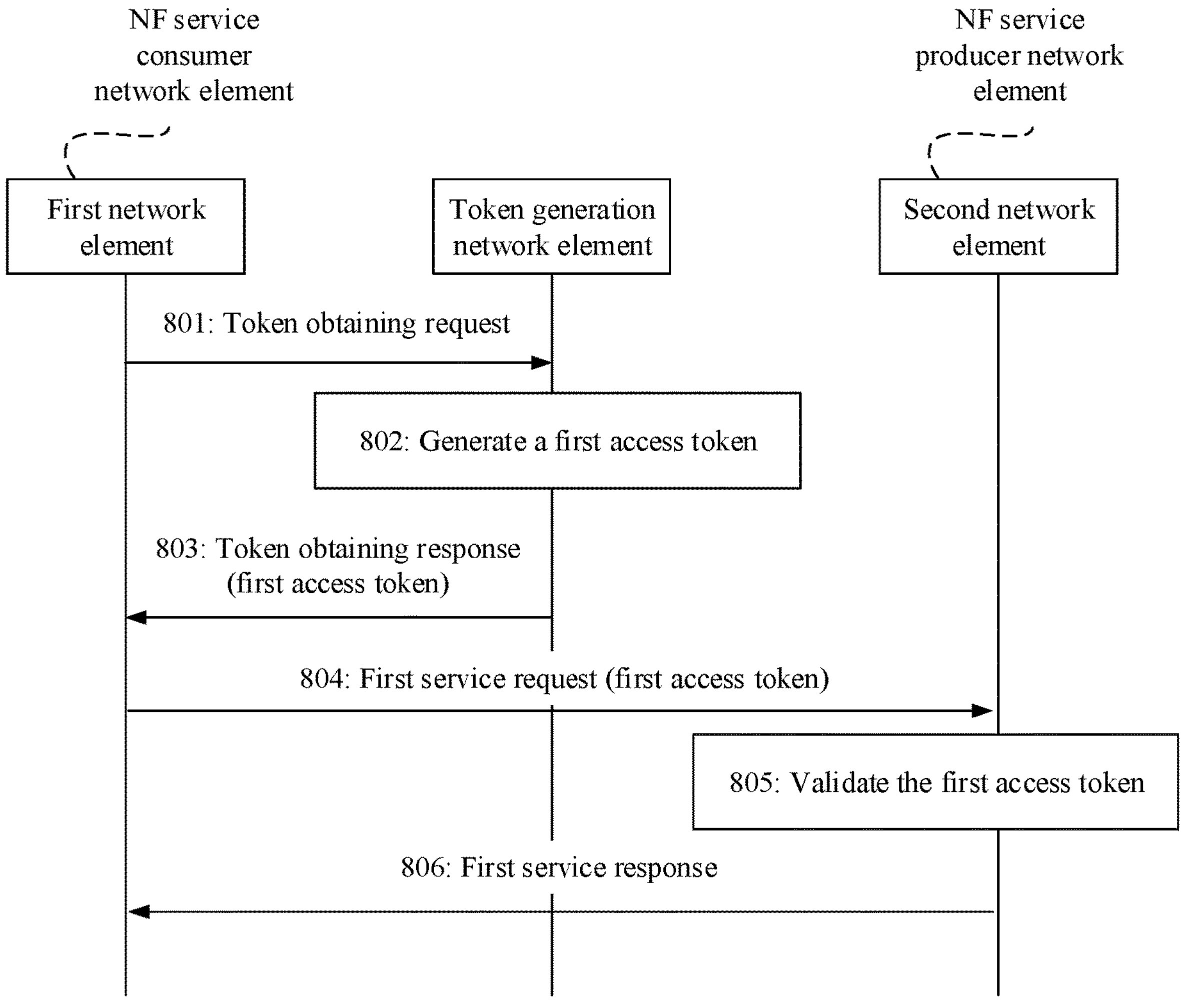
FIG. 8 is a schematic flowchart of another service authorization method according to an embodiment of this application.

Specifically, for specific descriptions of direct communication between the first network element and the second network element, refer to descriptions of an embodiment of FIG. 8. For specific descriptions of indirect communication between the first network element and the second network element, refer to descriptions of embodiments in FIG. 9 and FIG. 10.

When the method is applied to the indirect communication scenario, the first network element may directly send the token obtaining request to the token generation network element. In this case, the first network element may be the NF service consumer network element or the SCP network element #1 in FIG. 6. When the first network element is the SCP network element #1, after receiving a token obtaining request 1 from the NF service consumer network element, the first network element may perform API modification on the token obtaining request 1, and then send a token obtaining request 2 to the token generation network element, to request the token generation network element to generate an access token for the service requested by the NF service consumer network element. When the method is applied to the indirect communication scenario, the first network element may alternatively send the token obtaining request to the token generation network element via a first SCP network element. For example, the first network element is the NF service consumer network element in FIG. 6, and the first SCP network element is the SCP network element #1 in FIG. 6.

Step 702: The token generation network element generates a first access token in response to the token obtaining request. The first access token indicates that the NF service consumer network element has permission to access a specified service provided by the NF service producer network element belonging to a specified service domain. The first access token includes the identifier of the NF service consumer network element, an identifier of the specified service, and first service domain information associated with the specified service domain.

Optionally, after receiving the token obtaining request, the token generation network element may perform an authorization check on the NF service consumer network element based on the token obtaining request. The performing of the authorization check on the NF service consumer network element may include authenticating an identity of the NF service consumer network element. When the identity authentication succeeds, determining whether the NF service consumer network element has permission to obtain the specified service. When the NF service consumer network element has the permission, generating the first access token. When the NF service consumer network element does not have the permission, skipping generating the first access token. For an example execution process, refer to the descriptions in step 402*a*. Details are not described herein again.

In an implementation, when the authorization check on the NF service consumer network element succeeds, the token generation network element may further determine, in the following three manners, whether the generated first access token needs to include the first service domain information.

Manner 1: The token obtaining request may further include indication information. The indication information indicates whether the NF service consumer network element requests a token including the first service domain information. Then, the token generation network element may determine, based on the indication information, whether to generate the first access token including the first service domain information. For example, the indication information is indicated by one bit. When a value of the bit is 1, the bit indicates the token generation network element to generate the first access token carrying the first service domain information. When a value of the bit is 0, the bit indicates the token generation network element to generate an access token that does not carry the first service domain information. For another example, when the token obtaining request carries the indication information, the token generation network element may generate the first access token carrying the first service domain information, or when the token obtaining request does not carry the indication information, the token generation network element generates an access token that does not carry the first service domain information. Optionally, the access token used in the direct communication scenario may not include the service domain information, and the access token used in the indirect communication scenario includes the service domain information. In this case, the indication information may indicate that authorization information (namely, the access token) requested by the first network element is used for indirect communication. In this case, the token generation network element may generate, based on the indication information, the first access token carrying the first service domain information. If the indication information indicates that the authorization information requested by the first network element is used for direct communication, the token generation network element generates, based on the indication information, an access token that does not carry the first service domain information. Optionally, the indication information may be carried in a message body or a message header.

Optionally, the token obtaining request does not carry new indication information. Instead, an existing information element indicates the token generation network element to generate or not the first access token carrying the first service domain information. For example, an existing bit in the token obtaining request is used for indication. When a value of the bit is 1, the bit indicates the token generation network element to generate the first access token including the first service domain information. When a value of the bit is 0, the bit indicates the token generation network element to generate an access token that does not include the first service domain information.

Optionally, the token obtaining request implicitly indicates the token generation network element to generate the first access token carrying the first service domain information.

Manner 2: The token generation network element determines, based on one or more of the NF type of the NF service producer network element, the NF type of the NF service consumer network element, configuration information of the NF service consumer network element, or configuration information of the NF service producer network element, whether to generate the first access token carrying the first service domain information. The configuration information of the NF service consumer network element may be obtained by the token generation network element based on the identifier of the NF service consumer network element carried in the access token obtaining request. The configuration information of the NF service producer network element may be obtained through the identifier of the NF service producer network element carried in the access token obtaining request. For example, the token generation network element may generate the first access token for indirect communication between network elements of specific NF types, for example, indirect communication between an AMF network element and an SMF network element. For example, the configuration information of the NF service consumer network element or the configuration information of the NF service producer network element each may include one or more pieces of information about an SCP domain including an NF network element that can communicate with the NF service consumer network element or the NF service producer network element, information about an SCP security domain to which the NF service consumer network element or the NF service producer network element belongs, or information about an accessible SCP security domain. For example, the configuration information of the NF service consumer network element includes the information about SCP domains that can communicate with each other. In this case, the token generation network element generates an access token carrying the service domain information. For another example, when the configuration information of the NF service consumer network element includes the SCP security domain to which the NF service consumer network element belongs, the token generation network element generates an access token carrying the service domain information. In other words, the configuration information of the NF service consumer network element includes the information about an SCP domain including an NF network element that can communicate with the NF service consumer network element, which indicates the token generation network element to generate the access token carrying the service domain information.

It should be noted that, in some embodiments, configuration information of the NF network element may also be referred to as NF configuration information.

Manner 3: The token generation network element determines, based on a local policy, whether to generate the first access token. If the local policy supports generation of the access token including the first service domain information, the token generation network element may generate the first access token. If the local policy includes that a PLMN supports indirect communication, the token generation network element may generate the first access token. If the local policy includes that a PLMN to which the NF service consumer network element belongs supports indirect communication, the token generation network element may generate the first access token. If the local policy further includes that the PLMN supports direct communication, the token generation network element may also generate an access token. If the local policy further includes that the PLMN to which the NF service consumer network element belongs supports direct communication, the token generation network element may also generate an access token.

The first service domain information may be used to indicate a service domain to which the NF service consumer network element belongs, or indicates a service domain to which an NF service producer network element that the NF service consumer network element is allowed to access belongs. When the first service domain information indicates the service domain to which the NF service producer network element that the NF service consumer network element is allowed to access belongs, the specified service domain is the service domain to which the NF service producer network element that the NF service consumer network element is allowed to access belongs. In other words, the specified service domain is a service domain indicated by the first service domain information. When the first service domain information indicates the service domain to which the NF service consumer network element belongs, the specified service domain may be a service domain that can serve the service domain to which the NF service consumer network element belongs. In other words, the specified service domain is a service domain that can serve the service domain indicated by the first service domain information.

In some embodiments, the specified service domain may be a specified SCP domain, a specified security domain, or a specified SCP security domain. For the definitions, refer to the foregoing descriptions.

When the token obtaining request is used to request the access token of type 1, the first access token further includes a type of the NF service producer network element. When the token obtaining request is used to request the access token of type 2 or type 3, the first access token further includes the identifier of the NF service producer network element. Optionally, the first access token may further include one or more parameters in the claims in FIG. 4*a* or FIG. 4*b*.

Optionally, the token generation network element may further perform an integrity protection on the generated access tokens (for example, the first access token, a second access token, a third access token, and a fourth access token). Correspondingly, a process of verifying the access token includes performing integrity checking on the access token. For an example process, refer to the descriptions in step 402*a* and step 405*a*. Details are not described herein again.

Step 703: The token generation network element sends a token obtaining response to the first network element. The token obtaining response includes the first access token. Correspondingly, the first network element receives the token obtaining response from the token generation network element.

The token obtaining response includes the first access token, and the first access token is signed, or the token obtaining response further includes a MAC value of the first access token.

Step 701 to step 703 are a process in which the first network element requests the first access token from the token generation network element. In an implementation, the token generation network element may be the NRF network element in FIG. 6. In this case, the token obtaining request may be, for example, an Nnrf_AccessToken_Get_Request. When the first network element is the NF service consumer network element, for a process in which the first network element requests the first access token from the token generation network element in a direct communication manner (that is, step 701 to step 703), refer to the descriptions of step 401*a* to step 403*a*, step 401*b* to step 403*b*, and step 501*a* and step 502*a*. When the first network element is the SCP network element, for a process in which the first network element requests the first access token from the token generation network element in a direct communication manner, refer to the specific descriptions of step 502*b* to step 504*b* and step 503*c* to step 505*c*. When the first network element is the NF service consumer network element, for a process in which the first network element requests the first access token from the token generation network element in an indirect communication manner, refer to the descriptions of step 501*b* to step 505*b*. Details are not described herein again.

Step 704: The first network element sends a first service request for the specified service to the second network element. The first service request includes the first access token. Correspondingly, the second network element receives the first service request from the first network element.

When the token generation network element is an NRF network element, correspondingly, before step 704, the first network element further needs to query the token generation network element (the NRF network element) to discover an available NF service producer network element. When a discovery result indicates that there is an available NF service producer network element, the first network element sends the first service request for the specified service to the second network element. It should be noted that, if the first network element is not an initiator of the specified service, the first network element is an SCP network element rather than an NF service consumer network element. Before step 704, the first network element may further receive a service request from the NF service consumer network element, and the first network element sends the first service request to the second network element in response to the service request. Optionally, the service request from the NF service consumer network element may carry the first access token. For a corresponding process, refer to step 506*b* and step 507*b*. When the service request does not carry the first access token, the first network element performs step 701 (that is, the first network element sends the token obtaining request to the token generation network element) in response to the service request. For a corresponding process, refer to step 501*c* and step 506*c*.

Optionally, the first service request further includes a CCA or a signed CCA. The CCA is used by the NF service producer network element to authenticate the identity of the NF service consumer network element.

Step 705: The second network element sends a first service response to the first network element. The first service response is used to respond to the first service request. Correspondingly, the first network element receives the first service response from the second network element.

The NF service producer network element verifies the first access token. When verification performed by the NF service producer network element on the first access token succeeds, the NF service producer network element executes the specified service requested by the NF service consumer network element. The first service response is sent when verification performed by the NF service producer network element on the first access token succeeds. When the second network element is the NF service producer network element, the second network element sends the first service response when verification on the first access token succeeds. If the second network element is not the NF service producer network element, the second network element may be an SCP network element #1 or an SCP network element #2 in FIG. 6. When the second network element is the SCP network element #1, the second network element may further receive a service response from the SCP network element #2 before sending the first service response to the first network element. When the second network element is the SCP network element #2, the second network element may further receive a service response from the NF service producer network element before sending the first service response to the first network element. For an execution process in which the NF service producer network element verifies the first access token, refer to specific descriptions in step 805.

In some embodiments, the first service domain information is carried in the first access token, so that the NF service producer network element can determine, based on the first service domain information, whether the NF service consumer network element has permission to access a service provided by the NF service producer network element. This arrangement implements service domain-based access control, which improves security of the service authorization.

FIG. 8 is a schematic flowchart of another service authorization method according to an embodiment of this application. The method describes a service authorization procedure in a direct communication scenario, that is, a service authorization procedure when the system architecture shown in FIG. 6 does not include an SCP network element. The procedure describes an authorization verification performed by an NF service producer network element on an NF service consumer network element. A first network element is the NF service consumer network element, and a second network element is the NF service producer network element. The method may include but is not limited to the following steps disclosed herein. For examples of the processes of step 801 to step 804 and step 806, refer to the descriptions of step 701 to step 705. Details are not described herein again.

Step 801: The first network element sends a token obtaining request to a token generation network element. Correspondingly, the token generation network element receives the token obtaining request from the first network element. The token obtaining request includes an identifier of the NF service consumer network element and an identifier of a specified service.

Step 802: The token generation network element generates a first access token in response to the token obtaining request. The first access token indicates that the NF service consumer network element has permission to access a specified service provided by the NF service producer network element belonging to a specified service domain. The first access token includes the identifier of the NF service consumer network element, an identifier of the specified service, and first service domain information associated with the specified service domain.

Step 803: The token generation network element sends a token obtaining response to the first network element. The token obtaining response includes the first access token. Correspondingly, the first network element receives the token obtaining response from the token generation network element.

Step 804: The first network element sends a first service request for the specified service to the second network element. The first service request includes the first access token. Correspondingly, the second network element receives the first service request from the first network element.

Step 805: The second network element verifies the first access token.

That the NF service producer network element (namely, the second network element) verifies the first access token may include: determining, based on the first service domain information, whether the NF service consumer network element has permission to access a service provided by the NF service producer network element, and/or verifying other content (other than the first service domain information) of claims in the first access token. In other words, verification on the first access token includes verifying all parameters of the claims. Optionally, the verification on the first access token may further include checking integrity of the access token. If the integrity checking succeeds, it indicates that the content of the claims is not tampered with. Further, authorization verification is performed on the claims in the first access token. For an example process, refer to the descriptions in step 405*a*. Details are not described herein again. Optionally, if the first service request further includes a CCA, after successfully verifying the first access token, the NF service producer network element may further verify the CCA to authenticate the NF service consumer network element. A process in which the NF service producer network element performs authorization verification on the NF service consumer network element includes verifying all parameters in the first access token.

It should be noted that the NF service producer network element may determine, based on the first service domain information, whether the NF service consumer network element has permission to access the service provided by the NF service producer network element. The verifying, by the NF service producer network element, other content (other than the first service domain information) of claims in the first access token includes verifying an identifier of a specified service in the claims, to determine whether the NF service consumer network element has permission to access the specified service, that is, determine whether to provide the specified service for the NF service consumer network element. For example, the first service request further carries a parameter used to indicate a requested service. When the parameter matches the identifier of the specified service in the claims, it is determined that the NF service consumer network element has permission to access the specified service. When the parameter does not match the identifier of the specified service, it is determined that the NF service consumer network element does not have permission to access the specified service.

In an implementation, when the first service domain information indicates a service domain to which the NF service consumer network element (namely, the second network element) belongs, the NF service producer network element may determine, based on the service domain to which the NF service consumer network element belongs and locally configured service domain information, whether the NF service consumer network element has permission to access the specified service provided by the NF service producer network element belonging to the specified service domain. The locally configured service domain information is service domain information configured in the NF service producer network element. The service domain information configured for the NF service producer network element may include information about a service domain of the NF service producer network element (that is, the NF service producer network element can provide a service for a network element belonging to the service domain). When there is an intersection between a service domain indicated by the first service domain information and the service domain served by the NF service producer network element, namely, at least one of service domains served by the NF service producer network element is the same as the service domain indicated by the first service domain information, then it indicates that the NF service producer network element can serve the service domain to which the NF service consumer network element belongs, and it may be determined that the NF service consumer network element has permission to access a service provided by the NF service producer network element. When there is not an intersection between the service domain indicated by the first service domain information and the service domain served by the NF service producer network element, it indicates that the NF service producer network element cannot serve the service domain to which the NF service consumer network element belongs. In other words, the NF service consumer network element does not have permission to access the service provided by the NF service producer network element.

For example, the NF service consumer network element is an AMF network element #1, the NF service producer network element is an SMF network element #1, and a service domain indicated by the first service domain information in the first access token generated for the AMF network element #1 is a service domain a. When the first service domain information is service domain information of the AMF network element, it indicates that a service domain to which the AMF network element #1 belongs is the service domain a. If it is configured in the SMF network element #1 that the SMF network element #1 provides a service for a network element belonging to the service domain a, the SMF network element #1 determines that the AMF network element #1 has permission for the service provided by the SMF network element #1. If it is configured in the SMF network element #1 that the SMF network element #1 provides a service for a network element belonging to a service domain b, that is, the SMF network element #1 cannot provide a service for the network element belonging to the service domain a, the SMF network element #1 determines that the AMF network element #1 does not have permission to access the service provided by the SMF network element #1. In this way, resource access between different service domains can be restricted.

Optionally, if the service domain indicated by the first service domain information is the same as the service domain served by the NF service producer network element, it may be determined that the NF service consumer network element has permission for the service provided by the NF service producer network element. If the service domain indicated by the first service domain information is different from the service domain served by the NF service producer network element, it may be determined that the NF service consumer network element does not have permission to access the service provided by the NF service producer network element.

In another implementation, the first service domain information may be used to indicate a service domain to which an NF service producer network element that the NF service consumer network element is allowed to access belongs. The NF service producer network element may determine, based on the service domain to which the NF service producer network element belongs and the service domain to which the NF service producer network element that the NF service consumer network element is allowed to access belongs, whether the NF service consumer network element has permission to access the service provided by the NF service producer network element. The NF service producer network element may know a service domain to which the NF service producer network element belongs. It is assumed that there is an intersection between the service domain to which the NF service producer network element belongs and the service domain indicated by the first service domain information, that is, at least one of service domains to which the NF service producer network element belongs is the same as the service domain indicated by the first service domain information. In this case, it may be determined that the NF service consumer network element has permission to access the service provided by the NF service producer network element. If there is not an intersection between the service domain to which the NF service producer network element belongs and the service domain indicated by the first service domain information, it may be determined that the NF service consumer network element does not have permission to access the service provided by the NF service producer network element.

For example, the NF service consumer network element is the AMF network element #1, the NF service producer network element is the SMF network element #1, and service domains indicated by the first service domain information in the first access token generated for the AMF network element #1 are the service domains a and b. If the first service domain information is service domain information of the SMF network element, it indicates that service domains to which an SMF network element that the AMF network element #1 is allowed to access belongs include the service domain a and the service domain b, or the AMF network element #1 has permission to access a service provided by the SMF network element belonging to the service domain a and/or the service domain b. If the SMF network element #1 belongs to the service domain a, the SMF network element #1 determines that the AMF network element #1 has permission to access a service provided by the SMF network element #1. If the SMF network element #1 belongs to a service domain c, the SMF network element #1 determines that the AMF network element #1 does not have permission to access the service provided by the SMF network element #1.

Optionally, if the service domain to which the NF service producer network element belongs is the same as the service domain indicated by the first service domain information, it may be determined that the NF service consumer network element has permission to access the service provided by the NF service producer network element. If the service domain to which the NF service producer network element belongs is different from the service domain indicated by the first service domain information, it may be determined that the NF service consumer network element does not have permission to access the service provided by the NF service producer network element.

Step 806: When the verification on the first access token succeeds, the second network element sends a first service response to the first network element. The first service response is used to respond to the first service request. Correspondingly, the first network element receives the first service response from the second network element.

In some embodiments, the first service domain information is carried in the first access token, so that the NF service producer network element can determine, based on the first service domain information, whether the NF service consumer network element has permission to access the service provided by the NF service producer network element. This arrangement facilitates for service domain-based access control, which improves security of the service authorization. In addition, the service domain information is carried in the access token, so that resource access between different service domains can be restricted.

Figure 9:
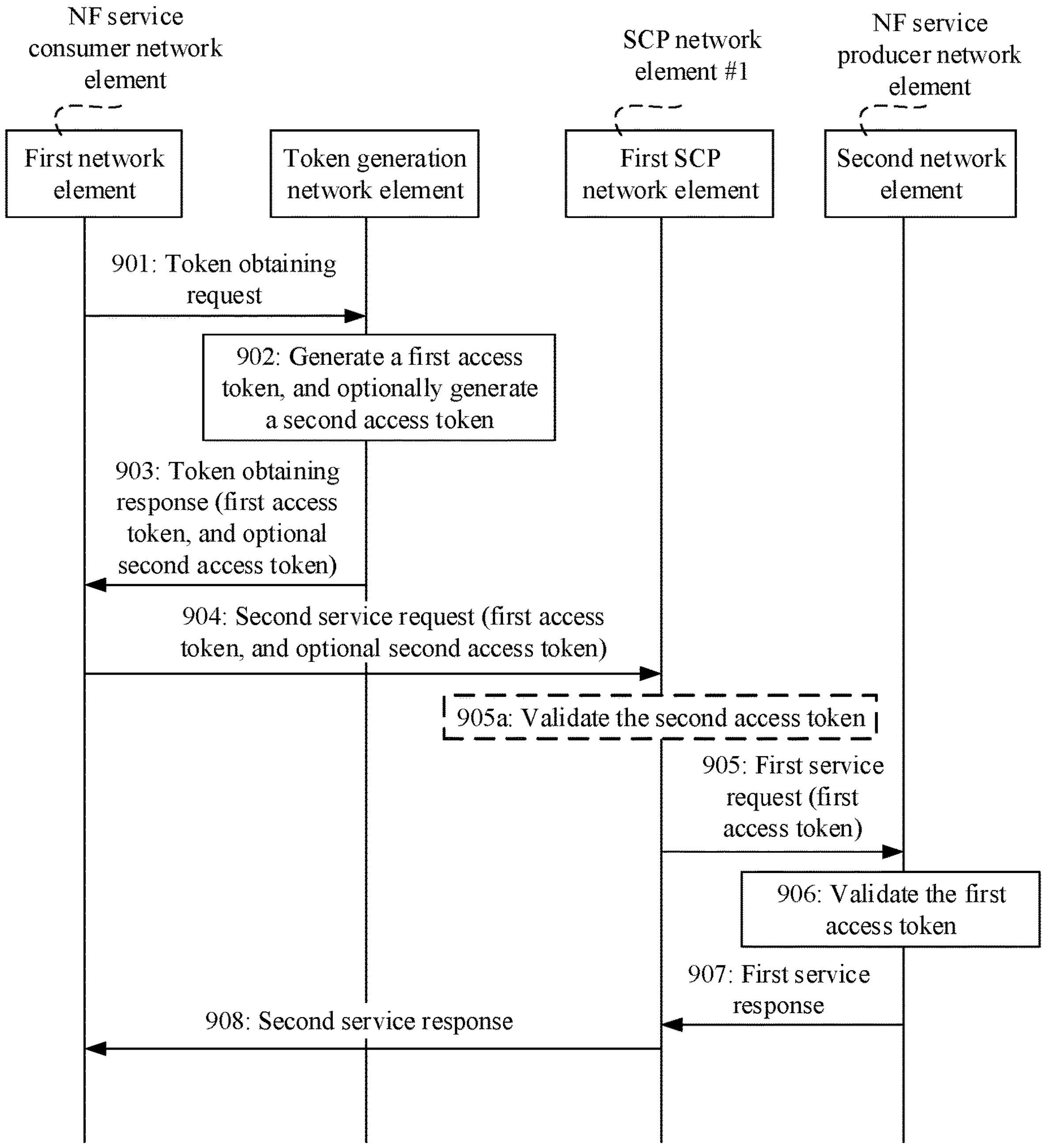
FIG. 9 is a schematic flowchart of still another service authorization method according to an embodiment of this application.

FIG. 9 is a schematic flowchart of still another service authorization method according to an embodiment of this application. The method describes a service authorization procedure in an indirect communication scenario, and describes authorization verification performed by an SCP network element on an NF service consumer network element. A first network element is the NF service consumer network element, a second network element is an NF service producer network element, and a first SCP network element is an SCP network element #1. The method may include but is not limited to the following steps:

Step 901: The first network element sends a token obtaining request to a token generation network element. Correspondingly, the token generation network element receives the token obtaining request from the first network element. The token obtaining request includes an identifier of the NF service consumer network element and an identifier of a specified service.

The token obtaining request is used to request a first access token. For a parameter included in the token obtaining request, refer to step 701. Details are not described herein again.

Optionally, the token obtaining request is further used to request a second access token. The second access token indicates that the NF service consumer network element has permission to access the first SCP network element, or indicates that the NF service consumer network element has permission to obtain a specified service from the NF service producer network element via the first SCP network element. The token obtaining request used to request the second access token and the token obtaining request used to request the first access token may be a same token obtaining request, or may be different token obtaining requests.

In the embodiment of FIG. 9, the first access token is used by the NF service producer network element to perform an authorization verification on the NF service consumer network element in the indirect communication scenario.

Optionally, the token obtaining request is further used to request an access token in a direct communication scenario. The access token may not include service domain information, or the access token may include the service domain information. For content of the access token, refer to the foregoing descriptions.

Step 902: The token generation network element generates the first access token in response to the token obtaining request. The first access token indicates that the NF service consumer network element has permission to access a specified service provided by the NF service producer network element belonging to a specified service domain. The first access token includes the identifier of the NF service consumer network element, an identifier of the specified service, and first service domain information associated with the specified service domain.

Optionally, the token generation network element performs an authorization check on the NF service consumer network element based on the token obtaining request. For an execution process in which the token generation network element performs the authorization check on the NF service consumer network element and generates the first access token, refer to the descriptions in step 702. Details are not described herein again.

Optionally, if the token obtaining request is further used to request the second access token, the token generation network element further generates the second access token. The service domain information in the second access token may include information about a service domain to which the first network element belongs or information about a service domain to which an SCP network element that the first network element is allowed to access belongs. The second access token further includes an NF instance ID of the token generation network element and an NF instance ID of the NF service consumer network element. Optionally, the second access token further includes an ID of an NF set to which the NF service consumer network element belongs or an ID of an NF set to which an SCP network element that the NF service consumer network element is allowed to access belongs. The second access token further includes slice information (for example, S-NSSAI and/or an NSI ID) of the NF service consumer network element, or slice information of the SCP network element that the NF service consumer network element is allowed to access. Correspondingly, a process in which the first SCP network element (that is, a 1st SCP network element through which a service request sent by the first network element to the second network element passes) performs authorization verification on the second access token also includes verification on the NF set ID and the slice information in the second access token. For a specific process, refer to step 405*a*.

Step 903: The token generation network element sends a token obtaining response to the first network element. The token obtaining response includes the first access token, and optionally, further includes the second access token. Correspondingly, the first network element receives the token obtaining response from the token generation network element.

When receiving the first access token and the second access token, the first network element may distinguish between the access tokens by parameters carried in the access tokens. A parameter carried in the first access token includes an NF type of the NF service producer network element, and a parameter carried in the second access token includes a type of the SCP network element (SCP Type). Therefore, whether the access token is the first access token or the second access token may be determined based on whether the parameter carried in the access token is the NF type of the NF service producer network element or the type of the SCP network element.

Step 901 to step 903 describe a process in which the first network element directly requests the first access token from the token generation network element. In an implementation, the first network element may further request the first access token from the token generation network element via the first SCP network element or another SCP network element. Specifically, the first network element sends a token obtaining request 1 to the token generation network element via the first SCP network element. The token obtaining request 1 includes the identifier of the NF service consumer network element and the identifier of the specified service. The token generation network element generates the first access token in response to the token obtaining request 1. The first network element receives a token obtaining response 1 from the token generation network element via the first SCP network element, where the token obtaining response 1 includes the first access token. It should be noted that the token obtaining request 1 may be transmitted to the token generation network element in a non-transparent transmission mode, and the token obtaining response 1 sent by the token generation network element may be transmitted to the first network element in a non-transparent transmission mode.

In an implementation, before generating the first access token, the token generation network element may further determine that one or more of the following conditions are met: the NF service consumer network element and the first SCP network element belong to a same service domain, service domains served by the first SCP network element include a service domain to which the NF service consumer network element belongs, NF sets served by the first SCP network element include the NF set to which the NF service consumer network element belongs, or slices served by the first SCP network element include a slice to which the NF service consumer network element belongs.

That the one or more conditions are met may indicate that the NF service consumer network element may request the access token (for example, the first access token or the second access token) from the token generation network element via the first SCP network element, or the first SCP network element may obtain the access token for the NF service consumer network element as a proxy. Configuration information of the first SCP network element may include but is not limited to: information about a service domain to which the first SCP network element belongs, information about the service domains served by the first SCP network element, information about the NF sets served by the first SCP network element, or information about the slices served by the first SCP network element. Configuration information of the NF service consumer network element may include but is not limited to: information about the service domain to which the NF service consumer network element belongs, information about the NF set to which the NF service consumer network element belongs, or information about the slice to which the NF service consumer network element belongs. Therefore, whether the foregoing condition is met may be determined by using the configuration information of the NF service consumer network element and the configuration information of the first SCP network element. Specifically, the token generation network element obtains the configuration information of the NF service consumer network element based on the identifier of the NF service consumer network element in the token obtaining request. The token generation network element obtains the configuration information of the first SCP network element based on an identifier of the first SCP network element obtained in a process of establishing the transport layer security (TLS) protocol or the identifier of the first SCP network element in the token obtaining request.

Step 904: The first network element sends a second service request for a specified service to the first SCP network element. The second service request includes the first access token, and optionally, further includes the second access token. Correspondingly, the first SCP network element receives the second service request from the first network element.

Information about one or more SCP network elements that serve an NF network element (including the first network element) is configured on the NF network element. When performing communication in an indirect communication manner, the first network element determines a first SCP network element based on the configured SCP information, and sends the second service request to the first SCP network element. It should be noted that an SCP network element participating in a process in which the first network element requests the first access token from the token generation network element may be the same as or different from an SCP network element participating in a process in which the first network element requests the specified service from the second network element. This is not limited in some embodiments.

Optionally, the second service request further includes a CCA used by NF service producer network element to authenticate an identity of the NF service consumer network element.

Optionally, when receiving the second access token, the first SCP network element verifies the second access token, to verify whether the NF service consumer network element has permission to access the first SCP network element. For example, refer to step 905 in FIG. 9. It should be noted that the second access token may be carried in the second service request, that is, the second access token and the first access token are carried in a same message. Alternatively, the second access token and the first access token are carried in different messages.

That the first SCP network element verifies the second access token may include, determining, based on the service domain information in the second access token, whether the NF service consumer network element has permission to access the first SCP network element, and verifying other content in claims in the second access token. Optionally, integrity of the second access token may be checked. If the integrity checking succeeds, it indicates that content of the claims is not tampered with. Further, authorization verification is performed based on the claims in the second access token. For a specific process, refer to the descriptions in step 405*a*. Details are not described herein again. In other words, in some embodiments, verification on the access token includes verifying all parameters in the access token.

A process in which the first SCP network element verifies the service domain information in the second access token is similar to a process in which the NF service producer network element verifies the first service domain information in the first access token. For details, refer to the descriptions in step 805. In an implementation, when the service domain information in the second access token includes the information about the service domain to which the NF service consumer network element belongs, the first SCP network element may determine, based on the information about the service domain to which the NF service consumer network element belongs and service domain information configured in the first SCP network element, whether the NF service consumer network element has permission to access the first SCP network element. The service domain information configured in the first SCP network element may include the information about the service domains served by the first SCP network element (that is, the first SCP network element can provide a service for a network element belonging to the service domain). When a service domain indicated by the service domain information in the second access token has an intersection with or is the same as the service domain served by the first SCP network element, it indicates that the first SCP network element can serve the service domain to which the NF service consumer network element belongs, and it may be determined that the NF service consumer network element has permission to access the first SCP network element. When the service domain indicated by the service domain information in the second access token does not have an intersection with or is different from the service domain served by the first SCP network element, it indicates that the first SCP network element cannot serve the service domain to which the NF service consumer network element belongs, that is, the NF service consumer network element does not have permission to access the first SCP network element.

In an implementation, it is assumed that the service domain information in the second access token includes information about a service domain to which the SCP network element that the NF service consumer network element is allowed to access belongs. In this case, the first SCP network element may determine, based on the service domain to which the first SCP network element belongs and the service domain to which the SCP network element that the NF service consumer network element is allowed to access belongs, whether the NF service consumer network element has permission to access the first SCP network element. The first SCP network element may learn of a service domain to which the first SCP network element belongs. If the service domain to which the first SCP network element belongs has an intersection with or is the same as the service domain to which the SCP network element that the NF service consumer network element is allowed to access belongs, it may be determined that the NF service consumer network element has permission to access the first SCP network element. When the service domain to which the first SCP network element belongs does not have an intersection with or is different from the service domain to which the SCP network element that the NF service consumer network element is allowed to access belongs, it may be determined that the NF service consumer network element does not have permission to access the first SCP network element.

Step 905*a* is a manner in which the first SCP network element performs an authorization check on the NF service consumer network element. In another manner, the first SCP network element may perform the authorization check on the NF service consumer network element based on the first access token, to determine whether the NF service consumer network element has permission to access the first SCP network element.

Step 905: The first SCP network element sends the first service request for the specified service to the second network element. The first service request includes the first access token. Correspondingly, the second network element receives the first service request from the first SCP network element.

Optionally, when the first SCP network element receives the second access token, and verification on the second access token succeeds, the first SCP network element sends the first service request for the specified service to the second network element in response to the second service request. Optionally, when the second service request includes a CCA, the first service request further includes the CCA.

Optionally, the first service request may further include a third access token used to indicate that the first SCP network element has permission of a communication proxy, so that the second network element performs an authorization check on the first SCP network element. Optionally, the first SCP network element may request the third access token from the token generation network element. A token obtaining request for the third access token may include an identifier of the first SCP network element, and may further include a name of a communication proxy service, to indicate the token generation network element to generate an access token (namely, the third access token) for the communication proxy service that is expected by the first SCP network element. The third access token may be carried in the first service request, that is, the third access token and the first access token are carried in a same message. Alternatively, the third access token and the first access token are carried in different messages.

Step 906: The second network element verifies the first access token. For an execution process of step 906, refer to the descriptions of step 805. Details are not described herein again.

When receiving the third access token, the second network element determines, based on the third access token, whether the first SCP network element has permission to send the first service request to the second network element, that is, determines whether the first SCP network element has permission to provide a routing and forwarding function for a message to be sent to the second network element. In other words, the third access token is verified to determine whether the first SCP network element has permission of a communication proxy.

Whether the first SCP network element has the permission of a communication proxy may also be described as whether the first SCP network element has the permission to send the first service request to the second network element.

The verifying, by the second network element, the third access token may include, determining, based on service domain information in the third access token, whether the first SCP network element has permission of a communication proxy, and verifying other content of claims in the third access token. Optionally, integrity of the third access token may be checked. If the integrity checking succeeds, it indicates that content of the claims is not tampered with. Further, an authorization verification is performed based on the claims in the third access token. For an example process, refer to the descriptions in step 405*a*. Details are not described herein again. It should be noted that, both the third access token and the second access token are used for authentication between two adjacent hops. A difference lies in that the second access token is used to authenticate the NF service consumer network element, and the third access token is used to authenticate the SCP network element. A verification result of the second access token is the NF service consumer network element has/does not have permission to access the next-hop SCP network element, and a verification result of the third access token is the SCP network element has/does not have permission of a communication proxy for a next-hop network element. Therefore, the process of verifying the third access token is similar to the process of verifying the second access token. The process is briefly described herein. For details, refer to the process of verifying the second access token.

The service domain information in the third access token may include the information about the service domain to which the first SCP network element belongs or information about a service domain to which an SCP network element that the first SCP network element is allowed to access belongs. It is assumed that the service domain information in the third access token includes the information about the service domain to which the first SCP network element belongs, and a service domain indicated by the service domain information in the third access token has an intersection with or is the same as a service domain of a service locally configured in a next-hop network element (which is referred to as the second SCP network element or the like) of the first SCP network element. In this case, it indicates that the second SCP network element can serve the service domain to which the first SCP network element belongs, and it may be determined that the first SCP network element has permission of a communication proxy. If the service domain information in the third access token includes the information about the service domain to which the SCP network element that the first SCP network element is allowed to access belongs, and the service domain indicated by the service domain information in the third access token has an intersection with or is the same as a service domain to which the second SCP network element belongs, it indicates that the first SCP network element has the permission of a communication proxy.

Optionally, the third access token may further include an ID of an NF set to which the first SCP network element belongs, or an ID of an NF set to which another network element (for example, the SCP network element or the NF service producer network element) that the first SCP network element is allowed to access belongs, and includes information (for example, S-NSSAI and/or an NSI ID) about a slice to which the first SCP network element belongs, or information about a slice to which the another network element (for example, the SCP network element or the NF service producer network element) that the first SCP network element is allowed to access belongs. Correspondingly, a process in which the next-hop network element (for example, the second SCP network element or the NF service producer network element) of the first SCP network element verifies the third access token also includes verification on the NF set ID and the slice information in the third access token. For an example process, refer to the foregoing descriptions.

It should be noted that, the second network element being the NF service producer network element is merely used as an example in the embodiment of FIG. 9. In another implementation, the first SCP network element and the second network element may further interact with each other via one or more SCP network elements. Each SCP network element may authenticate a previous-hop SCP network element based on an access token obtained by the previous-hop SCP network element from the token generation network element, to verify whether the previous-hop SCP network element has permission of a communication proxy.

Step 907: When verification on the first access token succeeds, the second network element sends a first service response to the first SCP network element. The first service response is used to respond to the first service request. Correspondingly, the first SCP network element receives the first service response from the second network element.

Step 908: The first SCP network element sends a second service response to the first network element. The second service response is used to respond to the second service request. Correspondingly, the first network element receives the second service response from the first SCP network element.

In the indirect communication scenario, the service authorization process involves more network elements than the process in the direct communication scenario, and a level of security is less secure. The NF service producer network element may perform an authorization check on the NF service consumer network element through the first access token, thereby implementing the authorization check on the NF service consumer network element that does not directly communicate with the NF service producer network element. In addition, through the second access token and the third access token, it may be checked whether the previous-hop network element has permission to access the current network element or has permission of a communication proxy. This can implement the authorization check between two ends of direct communication, and help improve security of service authorization.

Figure 10:
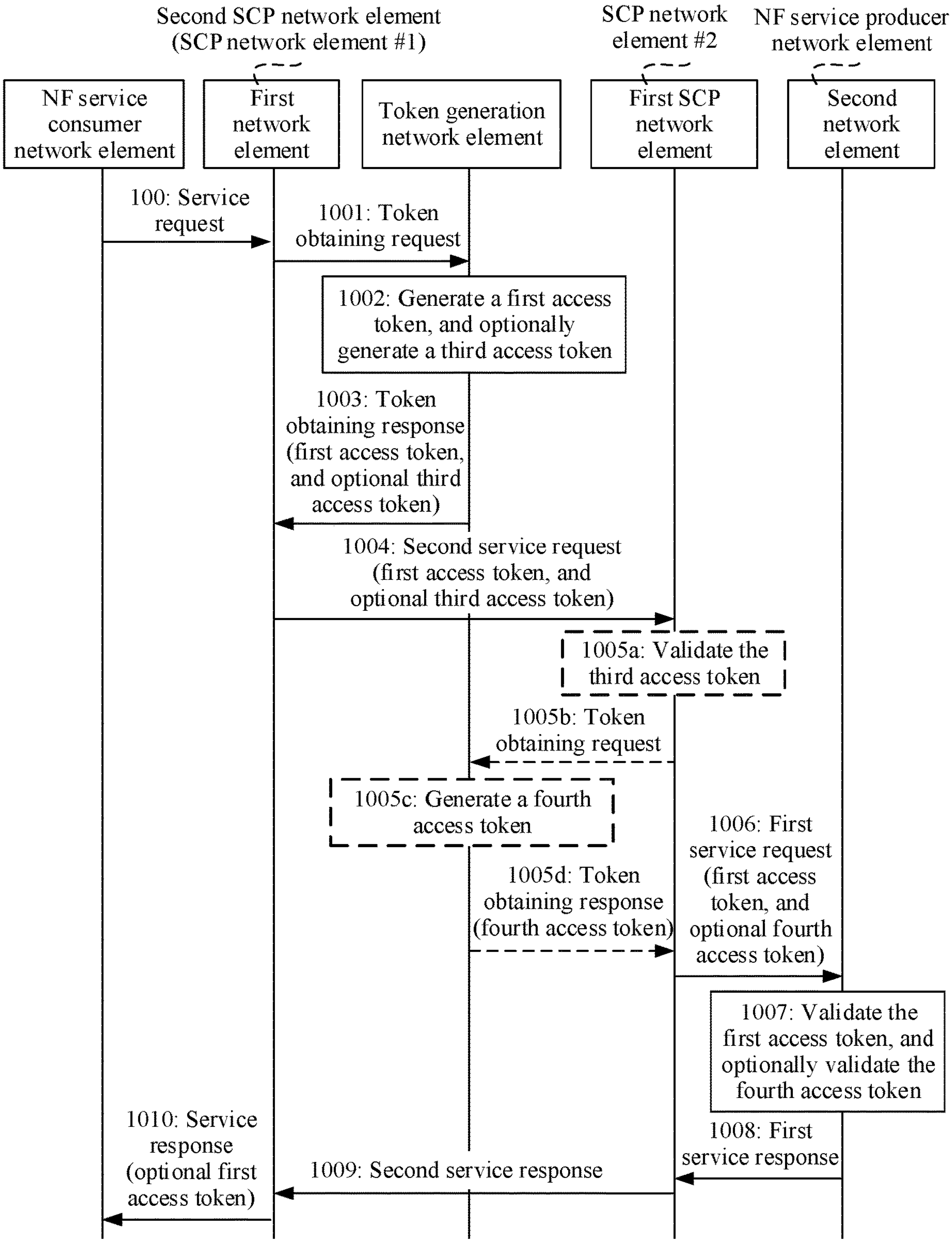
FIG. 10 is a schematic flowchart of yet another service authorization method according to an embodiment of this application.

FIG. 10 is a schematic flowchart of yet another service authorization method according to an embodiment of this application. The method describes a service authorization procedure in an indirect communication scenario, and describes a service authorization procedure in mode D. In the procedure, a first SCP network element performs authorization verification on a second SCP network element, and an NF service producer network element performs authorization verification on a second SCP network element. A first network element is the second SCP network element (for example, an SCP network element #1 in FIG. 6), the first SCP network element is, for example, an SCP network element #2 in FIG. 6, and a second network element is the NF service producer network element. The method may include but is not limited to the following steps:

Step 1000: An NF service consumer network element sends a service request for a specified service to the first network element. Correspondingly, the first network element receives the service request from the NF service consumer network element.

The service request is used to request the specified service from the NF service producer network element. The service request may include an identifier of the NF service consumer network element and an identifier of the specified service. Optionally, the service request further includes a parameter required for obtaining a first access token. Optionally, the service request further includes a parameter for discovering an NF service producer network element. For a procedure of discovering the NF service producer network element, refer to the foregoing descriptions. It should be noted that, mode C and mode D discovery manners mentioned above or the like may be used in some embodiments. For a specific process, refer to the foregoing descriptions. Details are not described herein again.

Optionally, the service request further includes a CCA used by NF service producer network element to authenticate an identity of the NF service consumer network element.

Step 1001: The first network element sends a token obtaining request to a token generation network element. Correspondingly, the token generation network element receives the token obtaining request from the first network element. The token obtaining request includes the identifier of the NF service consumer network element and the identifier of the specified service.

When receiving the service request from the NF service consumer network element, the first network element may learn that the NF service consumer network element needs to obtain a service. Further, the first network element (namely, the second SCP network element) sends the token obtaining request to the token generation network element, to obtain the first access token. For a parameter included in the token obtaining request, refer to step 701. Details are not described herein again.

Optionally, the token obtaining request is further used to request a third access token. In the embodiment of FIG. 10, the third access token indicates that the first network element (namely, the second SCP network element) has permission of a communication proxy. Optionally, the token obtaining request is further used to request a second access token. In the embodiment of FIG. 10, the second access token indicates that the NF service consumer network element has permission to access the first network element. Optionally, the token obtaining request used to request the second access token, the token obtaining request used to request the first access token, and the token obtaining request used to request the third access token may be a same token obtaining request, or may be different token obtaining requests. For related content of the second access token, refer to the foregoing descriptions. The third access token indicates that the first network element has permission of a communication proxy. In the embodiments of FIG. 9 and FIG. 10, the third access token indicates that the SCP network element #1 has permission of a communication proxy. For content of the third access token, refer to the foregoing descriptions.

Step 1002: The token generation network element generates the first access token in response to the token obtaining request. The first access token indicates that the NF service consumer network element has permission to access a specified service provided by the NF service producer network element belonging to a specified service domain. The first access token includes the identifier of the NF service consumer network element, an identifier of the specified service, and first service domain information associated with the specified service domain.

Optionally, the token generation network element further generates the third access token, and optionally, further generates the second access token.

Step 1003: The token generation network element sends a token obtaining response to the first network element. The token obtaining response includes the first access token, optionally includes the third access token, and optionally includes the second access token. Correspondingly, the first network element receives the token obtaining response from the token generation network element.

If the first network element (namely, the second SCP network element) obtains the second access token, the first network element may authenticate the NF service consumer network element through the second access token. When the authentication succeeds, the first network element may send a second service request for the specified service to the first SCP network element. For an execution process of verifying the second access token, refer to the descriptions in step 904. A difference lies in that, step 904 is used to verify whether the NF service consumer network element has permission to access the first SCP network element, while step 1003 is used to verify whether the NF service consumer network element has permission to access the second SCP network element. In FIG. 10, the second SCP network element may be understood as a previous-hop network element of the first SCP network element.

The first access token, the second access token, and the third access token may be carried in a same token obtaining response, or may be carried in different token obtaining responses.

Step 1004: The first network element sends the second service request for the specified service to the first SCP network element. The second service request includes the first access token, and optionally, further includes the third access token. Correspondingly, the first SCP network element receives the second service request from the first network element.

Optionally, when the service request includes a CCA, the second service request further includes the CCA.

Optionally, when the first SCP network element obtains the third access token, the first SCP network element may verify the third access token. For example, refer to step 1005*a* in FIG. 10. For an execution process of verifying the third access token, refer to the descriptions in step 906. A difference lies in that, step 906 is used to verify whether the first SCP network element has permission of a communication proxy, while step 1004 is used to verify whether the second SCP network element has permission of a communication proxy.

Optionally, the service authorization procedure shown in FIG. 10 may further include a procedure of obtaining a fourth access token. For example, refer to steps 1005*b* to 1005*d* shown in FIG. 10. In step 1005*b*, the first SCP network element sends a token obtaining request for the fourth access token to the token generation network element. The token obtaining request for the fourth access token may include the identifier of the first SCP network element, and may further include a name of a communication proxy service, to indicate the token generation network element to generate the fourth access token for the communication proxy service that is expected by the first SCP network element. The fourth access token indicates to the NF service producer network element that the first SCP network element has permission of a communication proxy. Step 1005*c*: the token generation network element generates the fourth access token in response to the token obtaining request for the fourth access token. Step 1005*d*: the token generation network element sends a token obtaining response to the first SCP network element, where the response includes the fourth access token. Similar to the third access token, the fourth access token is used to authenticate the SCP network element. For related content of the fourth access token, refer to the third access token.

In the embodiment of FIG. 10, that the NF service consumer network element interacts with the NF service producer network element via two network elements (the first network element (namely, the second SCP network element) and the first SCP network element) is used as an example. Intermediate network elements through which the service request pass are authenticated in the service authorization process. Correspondingly, the intermediate network elements (namely, the second SCP network element and the first SCP network element) need to request corresponding access tokens from the token generation network element. In this way, security of service authorization is improved.

Step 1006: The first SCP network element sends a first service request for a specified service to the second network element. The first service request includes the first access token, and optionally, includes the fourth access token. Correspondingly, the second network element receives the first service request from the first SCP network element.

Optionally, when verification on the third access token succeeds (that is, an authorization check performed by the first SCP network element on the second SCP network element succeeds), the first SCP network element may send the first service request for the specified service to the second network element. Optionally, when the second service request further includes a CCA, the first service request further includes the CCA.

Step 1007: The second network element verifies the first access token. Optionally, when the first service request includes the fourth access token, the fourth access token is further verified.

For an execution process of step 1007, refer to the specific descriptions of step 805. Details are not described herein again. For a process of verifying the fourth access token, refer to the process of verifying the third access token.

Optionally, the fourth access token may further include an ID of an NF set to which the first SCP network element belongs, or an ID of an NF set to which an NF service producer network element that the first SCP network element is allowed to access belongs, and includes information (for example, S-NSSAI and/or an NSI ID) about a slice to which the first SCP network element belongs, or information about a slice to which the NF service producer network element that the first SCP network element is allowed to access belongs. Correspondingly, the process in which the NF service producer network element verifies the fourth access token also includes verification on the NF set ID and the slice information in the fourth access token. For a specific example process, refer to the foregoing descriptions.

It should be noted that in some embodiments, when one network element needs to verify two or more access tokens, a sequence of verification is not limited.

Step 1008: When verification on the first access token succeeds, the second network element sends a first service response to the first SCP network element. The first service response is used to respond to the first service request.

Correspondingly, the first SCP network element receives the first service response from the second network element.

Step 1009: The first SCP network element sends a second service response to the first network element. The second service response is used to respond to the second service request. Correspondingly, the first network element receives the second service response from the first SCP network element.

Step 1010: The first network element sends a service response to the NF service consumer network element. The service response is used to respond to the service request in step 1000. Correspondingly, the NF service consumer network element receives the service response from the first network element.

Optionally, the service response may carry the first access token. Optionally, the service response may further carry the second access token for subsequent use by the NF service consumer network element.

In some embodiments, in the service authorization process, each hop network element, through which the service request passes, performs authorization check on a previous-hop network element through which the service request passes. This improves security of a service authorization.

Corresponding to the methods provided in the foregoing method embodiments, embodiments of this application further provides corresponding apparatuses. The apparatuses each include corresponding modules configured to perform the foregoing embodiments. The module may be software, hardware, or a combination of software and hardware.

Figure 11:
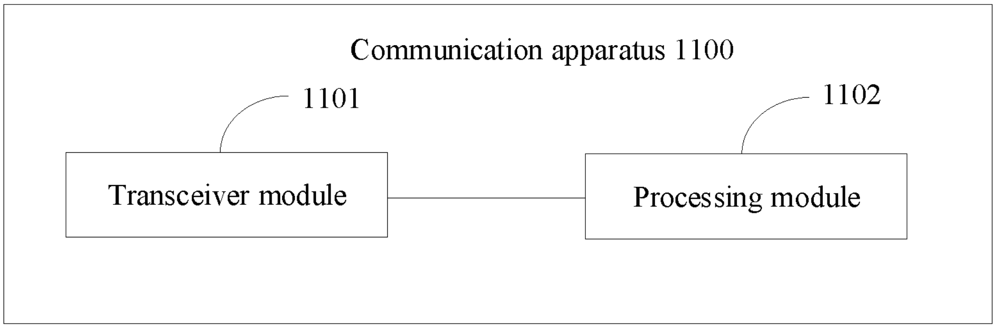
FIG. 11 is a schematic diagram of a structure of a communication apparatus according to an embodiment of this application.

FIG. 11 is a schematic diagram of a structure of a communication apparatus according to this application. A communication apparatus 1100 shown in FIG. 11 includes a transceiver module 1101 and a processing module 1102.

In a design, the apparatus 1100 is a first network element.

For example, the processing module 1102 is configured to obtain a first access token from a token generation network element through the transceiver module 1101. The first access token indicates that an NF service consumer network element has permission to access a specified service provided by an NF service producer network element belonging to a specified service domain. The first access token includes an identifier of the NF service consumer network element, an identifier of the specified service, and first service domain information associated with the specified service domain.

The transceiver module 1101 is further configured to send a first service request for the specified service to a second network element, where the first service request includes the first access token.

When the apparatus 1100 is the first network element, the apparatus 1100 is configured to implement functions of the first network element in the embodiments shown in FIG. 7 to FIG. 10.

In a design, the apparatus 1100 is a second network element.

For example, the transceiver module 1101 is configured to receive a first service request and send a first service response. The first service response is used to respond to the first service request. The first service request includes a first access token. The first access token indicates that an NF service consumer network element has permission to access a specified service provided by an NF service producer network element belonging to a specified service domain. The first access token includes an identifier of the NF service consumer network element, an identifier of the specified service, and first service domain information associated with the specified service domain.

When the apparatus 1100 is the second network element, the apparatus 1100 is configured to implement functions of the second network element in the embodiments shown in FIG. 7 to FIG. 10.

In a design, the apparatus 1100 is a token generation network element.

For example, the transceiver module 1101 is configured to receive a token obtaining request, where the token obtaining request includes an identifier of an NF service consumer network element and an identifier of a specified service.

The processing module 1102 is configured to generate a first access token in response to the token obtaining request. The first access token indicates that the NF service consumer network element has permission to access a specified service provided by an NF service producer network element belonging to a specified service domain. The first access token includes the identifier of the NF service consumer network element, the identifier of the specified service, and first service domain information associated with the specified service domain.

The transceiver module 1101 is further configured to send a token obtaining response, where the token obtaining response includes the first access token.

When the apparatus 1100 is a token generation network element, the apparatus 1100 is configured to implement functions of the token generation network element in the embodiments shown in FIG. 7 to FIG. 10.

Figure 12:
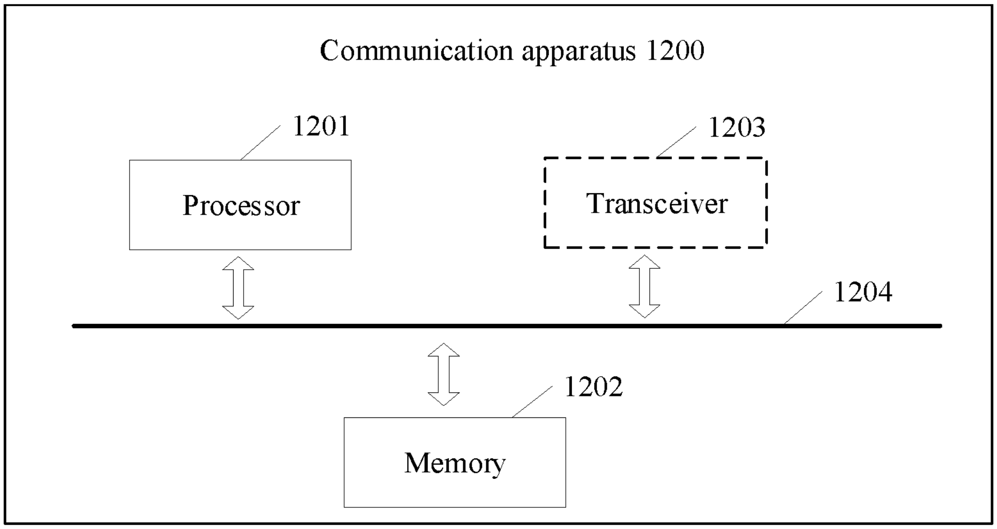
FIG. 12 is a schematic diagram of a structure of another communication apparatus according to an embodiment of this application.

FIG. 12 is a schematic diagram of a structure of another communication apparatus according to this application. A communication apparatus 1200 shown in FIG. 12 includes at least one processor 1201, a memory 1202, and optionally, may further include a transceiver 1203. A specific connection medium between the processor 1201 and the memory 1202 is not limited in some embodiments. The memory 1202 being connected to the processor 1201 through a bus 1204 is used as an example in FIG. 12. The bus 1204 is represented by a thick line in the figure. A manner of connection between other components is merely an example for description, and cannot be construed as a limitation. The bus 1204 may be classified into an address bus, a data bus, a control bus, and the like. For ease of representation, only one thick line is used to represent the bus in FIG. 12, but this does not mean that there is only one bus or only one type of bus.

The processor 1201 may have a data transceiver function, and can communicate with another device. In the apparatus shown in FIG. 12, an independent data transceiver module, for example, the transceiver 1203, may also be disposed and is configured to receive and send data. When communicating with the another device, the processor 1201 may transmit data through the transceiver 1203.

In an example, when a first network element uses the form shown in FIG. 12, the processor 1201 in FIG. 12 may invoke computer-executable instructions stored in the memory 1202, so that the first network element performs the method performed by the first network element in any one of the embodiments in FIG. 7 to FIG. 10.

In an example, when a second network element uses the form shown in FIG. 12, the processor 1201 in FIG. 12 may invoke computer-executable instructions stored in the memory 1202, so that the second network element performs the method performed by the second network element in any one of the embodiments in FIG. 7 to FIG. 10.

In an example, when a token generation network element uses the form shown in FIG. 12, the processor 1201 in FIG. 12 may invoke computer-executable instruction stored in the memory 1202, so that the token generation network element performs the method performed by the token generation network element in any one of the embodiments in FIG. 7 to FIG. 10.

Functions/implementation processes of the processing module and the transceiver module in FIG. 7 may be implemented by the processor 1201 in FIG. 12 invoking the computer-executable instructions stored in the memory 1202. Alternatively, a function/an implementation of the processing module in FIG. 7 may be implemented by the processor 1201 in FIG. 12 invoking the computer-executable instructions stored in the memory 1202, and a function/an implementation process of the transceiver module in FIG. 7 may be implemented by the transceiver 1203 in FIG. 12.

An embodiment of this application further provides a service authorization system. The system may include a first network element and a second network element in FIG. 6 to FIG. 10. Optionally, the system may further include a token generation network element in FIG. 6 to FIG. 10. Optionally, the system may further include one or more SCP network elements in FIG. 6 to FIG. 10. For example, the system further includes a first SCP network element.

The solutions described in this application may be implemented in various manners. For example, the technologies may be implemented by hardware, software, or a combination of software and hardware. For hardware implementation, a processing module configured to execute these technologies at a communication apparatus (for example, a base station, a terminal, a network entity, a core network element, or a chip) may be implemented in one or more general-purpose processors, digital signal processors (DSP), digital signal processor components, or application-specific integrated circuits (ASIC), programmable logic devices, field programmable gate arrays (FPGA), or another programmable logic apparatus, discrete gate or transistor logic, discrete hardware component, or any combination thereof. The general-purpose processor may be a microprocessor. Optionally, the general-purpose processor may also be any conventional processor, controller, microcontroller, or state machine. The processor may alternatively be implemented by a combination of computing apparatuses, for example, a digital signal processor and a microprocessor, a plurality of microprocessors, one or more microprocessors with a digital signal processor core, or any other similar configuration.

It may be understood that the memory in some embodiments may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memories in the system and method described in this specification include but are not limited to these memories and any other proper type of memory.

This application further provides a computer-readable medium storing a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by software, hardware, firmware, or any combination thereof. When embodiments are implemented by software, all or some of the embodiments may be implemented in a form of a computer program product. The computer program product includes one or more computer instructions. When the computer instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on a requirement. Correspondingly, the apparatus provided in embodiments of this application may also correspondingly implement these features or functions. Details are not described herein.

A person skilled in the art may further understand that various illustrative logical blocks and steps that are listed in embodiments of this application may be implemented by electronic hardware, computer software, or a combination thereof. Whether the functions are implemented by hardware or software depends on a particular application and a design requirement for an entire system. A person skilled in the art may use various methods to implement the functions for corresponding application, but it should not be considered that the implementation goes beyond the scope of embodiments of this application.

It may be understood that "an embodiment" mentioned in this specification means that particular features, structures, or characteristics related to the embodiment are included in at least one embodiment of this application. Therefore, embodiments in this specification do not necessarily refer to a same embodiment. In addition, these particular features, structures, or characteristics may be combined in one or more embodiments in any appropriate manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It should be understood that, in this application, "when" and "if" mean that an apparatus performs corresponding processing in an objective situation, and are not intended to limit time. The terms do not mean that the apparatus is required to have a determining action during implementation, and do not mean any other limitation.

In this application, an element represented in a singular form is intended to represent "one or more", but does not represent "one and only one", unless otherwise specified. In this application, unless otherwise specified, "at least one" is intended to represent "one or more", and "a plurality of" is intended to represent "two or more".

In addition, the terms "system" and "network" may be used interchangeably in this specification. The term "and/or" in this specification describes only an association relationship between associated objects and represents that three relationships may exist. For example, A and/or B may represent the following three cases: only A exists, both A and B exist, and only B exists. A may be singular or plural, and B may be singular or plural.

"Predefine" in this application may be understood as "define", "predefine", "store", "pre-store", "pre-negotiate", "pre-configure", "solidify", or "pre-burn".

A person of ordinary skill in the art may understand that, for the purpose of convenient and brief description, for a detailed working process of the foregoing system, apparatus, and unit, refer to a corresponding process in the foregoing method embodiments. Details are not described herein again.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The foregoing descriptions are implementations of this application, but are not intended to limit the scope of protection of this application.

The foregoing descriptions are merely implementations of this application, and the scope of protection of this application is not limited thereto. Any variation or replacement readily figured out by a person skilled in the art within the technical scope disclosed in this application shall fall within the scope of protection of this application.

What is claimed is:

1. A communication apparatus, wherein the apparatus comprises:

at least one processor coupled to at least one memory; and the at least one memory being configured to store instructions, and the at least one processor being configured to execute the instructions thereby causing the apparatus to:

obtain a first access token from a token generation network element, wherein the first access token comprises an identifier of a network function (NF) service consumer network element, an identifier of an NF service provider network element, and first service domain information associated with a specified service domain to which a network element having permission to access a specified service provided by the NF service provider network element belongs, and wherein the NF service consumer network element belongs to the specified service domain; and send a first service request for the specified service to a second network element, wherein the first service request comprises the first access token.

2. The apparatus according to claim 1, wherein the at least one processor being further configured to execute the instructions thereby further causing the apparatus to:

send the first service request for the specified service to the second network element via a first service communication proxy network element.

3. The apparatus according to claim 2, wherein the at least one processor being further configured to execute the instructions thereby further causing the apparatus to:

send a token obtaining request to the token generation network element via the first service communication proxy network element, wherein the token obtaining request comprises the identifier of the NF service consumer network element and the identifier of the NF service provider network elements, and receive a token obtaining response from the token generation network element via the first service communication proxy network element, wherein the token obtaining response comprises the first access token.

4. The apparatus according to claim 3, wherein the at least one processor being further configured to execute the instructions thereby further causing the apparatus to:

send a second service request for the specified service to the first service communication proxy network element, wherein the second service request comprises the first access token and a second access token, wherein the second access token, obtained from the token generation network element, indicates that the NF service consumer network element has permission to access the first service communication proxy network element.

5. The apparatus according to claim 1, wherein the apparatus is the NF service consumer network element or a second service communication proxy network element, the second network element is the NF service producer network element, and the specified service domain is a specified service communication proxy (SCP) domain, a specified security domain, or a specified SCP security domain.

6. The communication apparatus according to claim 1, wherein the at least one processor is further configured to execute the instructions thereby further causing the apparatus to:

send a token obtaining request to the token generation network element, wherein the token obtaining request comprises the identifier of the NF service consumer network element and the first service domain information; and receive a token obtaining response from the token generation network element, wherein the token obtaining response comprises the first access token.

7. A service authorization method, wherein the method comprises:

obtaining, by a first network element, a first access token from a token generation network element, wherein the first access token comprises an identifier of a network function (NF) service consumer network element, an identifier of an NF service provider network element, and first service domain information associated with a specified service domain to which a network element having permission to access a specified service provided by the NF service provider network element belongs, and wherein the NF service consumer network element belongs to the specified service domain; and sending, by the first network element, a first service request for the specified service to a second network element, wherein the first service request comprises the first access token.

8. The method according to claim 7, wherein the sending, by the first network element, the first service request for the specified service to the second network element comprises:

sending, by the first network element, the first service request for the specified service to the second network element via a first service communication proxy network element.

9. The method according to claim 8, wherein:

the obtaining, by the first network element, the first access token from the token generation network element comprises:

sending, by the first network element, a token obtaining request to the token generation network element via the first service communication proxy network element, wherein the token obtaining request comprises the identifier of the NF service consumer network element and the identifier of the NF service provider network element; and receiving, by the first network element, a token obtaining response from the token generation network element via the first service communication proxy network element, wherein the token obtaining response comprises the first access token.

10. The method according to claim 9, wherein the sending, by the first network element, the first service request for the specified service to the second network element via the first service communication proxy network element comprises:

sending, by the first network element, a second service request for the specified service to the first service communication proxy network element, wherein the second service request comprises the first access token and the second access token, wherein the second access token, obtained from the token generation network element, indicates that the NF service consumer network element has permission to access the first service communication proxy network element.

11. The method according to claim 7, wherein the method further comprises:

receiving, by the token generation network element, a token obtaining request, wherein the token obtaining request comprises the identifier of the NF service consumer network element and the identifier of the NF service provider network element;

generating, by the token generation network element, the first access token in response to the token obtaining request; and sending, by the token generation network element, a token obtaining response, wherein the token obtaining response comprises the first access token.

12. The method according to claim 11, wherein the token obtaining request is from a first service communication proxy network element; and the sending, by the token generation network element, the token obtaining response comprises:

sending, by the token generation network element, the token obtaining response to the first service communication proxy network element.

13. The method according to claim 7, wherein the obtaining, by the first network element, the first access token from the token generation network element comprises:

sending, by the first network element, a token obtaining request to the token generation network element, wherein the token obtaining request comprises the identifier of the NF service consumer network element and the first service domain information; and receiving, by the first network element, a token obtaining response from the token generation network element, wherein the token obtaining response comprises the first access token.

14. The method according to claim 7, wherein the method further comprises:

receiving, by the second network element from the first network element, the first service request; and sending, by the second network element, a first service response, wherein the first service response is used to respond to the first service request.

15. A communication apparatus, wherein the apparatus comprises:

at least one processor coupled to at least one memory; and the at least one memory being configured to store instructions, and the at least one processor being configured to execute the instructions thereby causing the apparatus to:

receive a first service request, wherein the first service request comprises a first access token, the first access token comprises an identifier of a network function (NF) service consumer network element, an identifier of an NF service provider network element, and first service domain information associated with a specified service domain to which a network element having permission to access a specified service provided by the NF service provider network element belongs, and wherein the NF service consumer network element belongs to the specified service domain; and send a first service response, wherein the first service response is used to respond to the first service request.

16. The apparatus according to claim 15, wherein the at least one processor is further configured to execute the instructions thereby further causing the apparatus to:

determine based on the first service domain information that the NF service consumer network element has permission to access the specified service provided by the NF service producer network element.

17. The apparatus according to claim 16, wherein the at least one processor is further configured to execute the instructions thereby further causing the apparatus to:

determine based on the specified service domain to which the NF service consumer network element belongs and service domain information configured in the second network element, that the NF service consumer network element has permission to access the service provided by the NF service producer network element, wherein the service domain to which the NF service consumer network element belongs is indicated by the first service domain information.

18. The apparatus according to claim 15, wherein the at least one processor is further configured to execute the instructions thereby further causing the apparatus to:

determine based on a third access token, that a first service communication proxy network element has permission to send the first service request to the second network element, wherein the third access token is comprised in the first service request and indicates that the first service communication proxy network element has permission of a communication proxy, and the first service request is from the first service communication proxy network element.

19. A service authorization method, wherein the method comprises:

receiving a first service request, wherein the first service request comprises a first access token, the first access token comprises an identifier of a network function (NF) service consumer network element, an identifier of an NF service provider network element and first service domain information associated with a specified service domain to which a network element has permission to access a specific service provided by the NF service provider network element belongs, and wherein the NF service consumer network element belongs to the specified service domain; and sending a first service response, wherein the first service response is used to respond to the first service request.

20. The method according to claim 19, wherein the method further comprises:

determining, based on the first service domain information, that the NF service consumer network element has permission to access the specific service provided by the NF service producer network element.

* * * * *